United States Patent
Watanabe

(10) Patent No.: US 11,104,312 B2
(45) Date of Patent: Aug. 31, 2021

(54) VEHICLE CONTROL APPARATUS

(71) Applicant: TOYOTA JIDOSHA KABUSHIKI KAISHA, Toyota (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/565,673

(22) Filed: Sep. 10, 2019

(65) Prior Publication Data
US 2020/0172065 A1    Jun. 4, 2020

(30) Foreign Application Priority Data

Dec. 3, 2018   (JP) .............................. JP2018-226452

(51) Int. Cl.
*B60T 8/1764* (2006.01)
*B60W 40/068* (2012.01)
*B60W 30/02* (2012.01)

(52) U.S. Cl.
CPC ........... *B60T 8/1764* (2013.01); *B60W 30/02* (2013.01); *B60W 40/068* (2013.01)

(58) Field of Classification Search
CPC ........ B60T 8/1764; B62D 6/002; B62D 6/003
See application file for complete search history.

(56) References Cited

U.S. PATENT DOCUMENTS

| | | | |
|---|---|---|---|
| 2002/0013646 A1 | 1/2002 | Nishizaki et al. | |
| 2006/0142922 A1* | 6/2006 | Ozaki | B60W 40/064 |
| | | | 701/70 |
| 2011/0077834 A1 | 3/2011 | Kudo et al. | |
| 2011/0257845 A1* | 10/2011 | Niki | B62D 5/046 |
| | | | 701/41 |
| 2012/0049617 A1 | 3/2012 | Furuyama | |
| 2012/0078483 A1* | 3/2012 | Yajima | B60W 40/068 |
| | | | 701/73 |
| 2012/0226417 A1* | 9/2012 | Nishikawa | B60W 30/12 |
| | | | 701/42 |
| 2013/0226410 A1* | 8/2013 | Narita | B62D 7/159 |
| | | | 701/41 |
| 2014/0142831 A1 | 5/2014 | Shimizu | |
| 2018/0304920 A1* | 10/2018 | Hirate | B62D 6/003 |

FOREIGN PATENT DOCUMENTS

| | | | |
|---|---|---|---|
| DE | 102005049368 A1 * | 4/2007 | ........... B60T 8/1764 |
| EP | 1209053 A1 * | 5/2002 | ........... B60T 8/1764 |
| JP | 05-097023 A | 4/1993 | |
| JP | 07-251654 A | 10/1995 | |
| JP | 09-249111 A | 9/1997 | |
| JP | 2001-334947 A | 12/2001 | |
| JP | 2007-209068 A | 8/2007 | |
| JP | 2011-073575 A | 4/2011 | |
| JP | 2012-051456 A | 3/2012 | |
| JP | 2013-018461 A | 1/2013 | |
| JP | 2018-090161 A | 6/2018 | |
| JP | 2018-095076 A | 6/2018 | |

* cited by examiner

*Primary Examiner* — Melanie Torres Williams
(74) *Attorney, Agent, or Firm* — Sughrue Mion, PLLC

(57) ABSTRACT

A vehicle control ECU determines a road surface μ state of a forward road of a vehicle based on a front image. The vehicle control ECU changes, in accordance with a determined result, a split determination threshold value which is used to determine whether to perform a vehicle behavior stabilization control for stabilizing a behavior of the vehicle.

4 Claims, 20 Drawing Sheets

VEHICLE CONTROL APPARATUS

BACKGROUND OF THE INVENTION

1. Field of the Invention

The present invention relates to a vehicle control apparatus configured to determine a state of a road surface on which a vehicle is traveling based on a front image of the vehicle (the front image is an image of a view/landscape in front (ahead) of the vehicle) and a wheel speed so as to perform a vehicle behavior stabilization control for stabilizing behavior of the vehicle based on a determined result of the state of the road surface.

2. Description of the Related Art

A steering device (hereinafter, referred to as a "conventional device") for a vehicle, which has been conventionally known, determines whether or not a wheel speed difference which is a magnitude of a difference of a wheel speed between right and left wheels is larger than a wheel speed difference threshold when an antilock brake control is being performed (refer to Japanese Patent Application Laid-Open No. 2001-334947).

When the wheel speed difference between the right and left wheels is larger than the wheel speed difference threshold, the conventional device determines that a traveling road (a road on which the vehicle is traveling) is a split μ road. The split t μ road is a road having friction/abrasion coefficients of road surfaces on the right and left sides of the vehicle being different from each other. Hereinafter, the friction coefficient may be referred to as a "road surface μ".

When the traveling road of the vehicle is determined to be the split μ road, the conventional device controls a steering mechanism so as to apply a so-called control steering angle to the wheel whose wheel speed is smaller among the left and right wheels in order to stabilize the behavior of the vehicle. The control is a control which generates a control yaw moment for canceling a yaw moment which acts on the vehicle due to a difference in the road surface μ between a left side road surface and a right side road surface of the vehicle. The control is sometimes referred to as a "vehicle behavior stabilization control".

However, the wheel speed difference of the left and right wheels varies depending on "a difference between a ground load of the left wheel and a ground load of the right wheel", "a difference between an unevenness of a grounding surface of the left wheel and an unevenness of a grounding surface of the right wheel", and/or the like. Therefore, when the wheel speed difference threshold has been set to an excessively small value in the conventional device, a case may occur where the wheel speed difference between the left and right wheels becomes larger than the wheel speed difference threshold, even when the traveling road of the vehicle is not the split μ road. When this happens, the conventional device may perform the vehicle behavior stabilization control even if the traveling road of the vehicle is not the split μ road, In contrast, when the wheel speed difference threshold has been set to an excessively large value in the conventional device, the conventional device does not start the behavior stabilization control unless the wheel speed difference between the left and right wheels becomes quite large. Therefore, in this case, when the traveling road of the vehicle changes into the split μ road, there is a probability that a start of the vehicle behavior stabilization control is delayed.

SUMMARY OF THE INVENTION

The present invention has been made in order to solve the above-described problem. That is, an object of the present invention is to provide a vehicle control apparatus which sets/changes the above-described wheel speed difference threshold (a split determination threshold) to an appropriate value to thereby be able to perform a vehicle behavior stabilization control appropriately. Hereinafter, the vehicle control apparatus is referred to as the "present invention apparatus".

The present invention apparatus is applied to a vehicle (SV), the vehicle including:

an imaging device (11) configured to be capable of obtaining a front image (100a, 100b, 100c, or 100d) by photographing a view in front of (or ahead of) the vehicle;

wheel speed sensors (12FL, 12FR, 12RL, and 12RR) configured to be capable of detecting a wheel speed (VwFL, VwFR, VwRL, or VwRR) of each of a plurality of wheels (WFL, WFR, WRL, or WRR) provided to the vehicle;

a brake device (BA) configured to be capable of controlling a braking force applied to each of the wheels;

a drive device (22, 23) configured to be capable of controlling a driving force applied to drive wheels among the wheels; and a steering device (31, 32, SW, SF) configured to be capable of changing a steering angle of steered wheels among the wheels.

The present invention apparatus comprises a vehicle control unit (10, 20, 30, 40) configured to be capable of performing:

a wheel slip control including at least any one of:
an antilock brake control performed using the brake device within an ABS condition satisfied period; and
a traction control performed using the drive device within an TRC condition satisfied period; and
a vehicle behavior stabilization control to apply to the vehicle a yaw moment for stabilizing a behavior of the vehicle using any one of the brake device, the drive device, and the steering device, when a magnitude (|Vdif|) of a wheel speed difference becomes larger than a split determination threshold (TdABS, TdTRC, TdEPS) within a predetermined period (Pd1) which starts a time point at which the wheel slip control is started while said wheel slip control is being performed, the wheel speed difference being a difference between:
a first wheel speed of a first wheel which is any one of the wheels which is being controlled by the wheel slip control; and
a second wheel speed of a second wheel which is any one of the wheels other than the first wheel and is symmetrically positioned about a center line of the vehicle with respect to the first wheel.

The vehicle control unit (10) of the present invention apparatus is configured:

to determine, based on the front image, whether or not a forward road of the vehicle is a left and right uniform μ road to be considered as a road which does not have a left and right road surface μ difference (refer to step 1015, step 1025, and step 1020), the left and right road surface μ difference being a magnitude of a difference between a left side friction coefficient of a road surface on which one or more of the wheels on a left side of the vehicle is grounded and a right side friction coefficient of a road surface on which one or more of the wheels on a right side of the vehicle is grounded;

to determine, based on the front image, whether or not the forward road of the vehicle is a split μ road to be considered as a road which has said left and right road surface μ difference (refer to step 1035);

to set the split determination threshold to a first threshold (refer to step 1025, step 1505, and step 1905), when the forward road is determined to be the left and right uniform μ road (refer to a "Yes" determination at step 1015 and a "Yes" determination at step 1020); and to set the split determination threshold to a second threshold smaller than the first threshold (refer to step 1040, step 1515, and step 1915), when the forward road is determined to be the split μ road (refer to a "Yes" determination at step 1015, a "No" determination at step 1020, and a "Yes" determination at step 1035).

According to the present invention apparatus, when it is determined that the forward road (i.e., the road ahead of the vehicle) is the left and right uniform μ road based on the front image, the split determination threshold is set to the first threshold which is a relatively large value. Therefore, when the traveling road of the vehicle has a high possibility of being the left and right uniform μ road, the magnitude of the wheel speed difference is made to have a low possibility of exceeding the split determination threshold (the first threshold). Accordingly, when the traveling road of the vehicle is actually the left and right uniform μ road, there is a low possibility that the traveling road of the vehicle is incorrectly determined to be the split μ road based on the magnitude of the wheel speed difference. Thus, the present invention apparatus can prevent the vehicle behavior stabilization control from being performed inappropriately when the traveling road of the vehicle is the left and right uniform μ road. Furthermore, according to the present invention apparatus, when it is determined that the forward road of the vehicle is the split μ road based on the front image, the split determination threshold is set to the second threshold value which is a relatively small value. Therefore, when the traveling road of the vehicle has a high possibility of being the split μ road, the magnitude of the wheel speed difference tends to easily exceed the split determination threshold (the second threshold). Accordingly, when the traveling road of the vehicle is actually the split μ road, there is a high possibility that traveling road is correctly determined to be the split μ road based on the magnitude of the wheel speed difference. Thus, according to the present invention apparatus, when the traveling road is actually the split μ road, the appropriate vehicle behavior stabilization can be made to surely be performed.

In one of aspects of the present invention apparatus, the vehicle control unit is configured to set the split determination threshold to a third threshold which is smaller than the first threshold and is larger than the second threshold (refer to step 1030, step 1510, and step 1910), when the forward road of the vehicle is determined to be neither the left and right uniform μ road nor the split μ road based on the front image (a "Yes" determination at step 1015, a "No" determination at step 1020, and a "No" determination at step 1035, or a "No" determination at step 1015).

According to the above-mentioned aspect, when it is determined that the forward road of the vehicle is neither the left and right uniform μ road nor the split μ road (that is, when the forward road of the vehicle is determined to be the undecidable road) based on the front image, the split determination threshold is set to "a value (that is, the third threshold) between the first threshold and the second threshold. Thereby, when the traveling road of the vehicle has a high possibility of being neither the left and right uniform μ road nor the split μ road, it is possible to reduce a possibility that the vehicle behavior stabilization control is performed inappropriately.

In one of aspects of the present invention apparatus, the vehicle control unit is configured to perform a steering assist control to change a steering angle of each of the steered wheels by changing a steering assist torque using the steering device (refer to step 2030 and step 2040).

Furthermore, the vehicle control unit is configured:
to set a magnitude (Taq) of the steering assist torque to a first torque value (Taq1)(refer to step 1905), when the forward road is determined to be the left and right uniform μ road (refer to a "Yes" determination at step 1015 of FIG. 19 and a "Yes" determination at step 1020); and to set a magnitude of the steering assist torque to a second torque value (Taq2) larger than the first torque value (refer to step 1915), when the forward road is determined to be the split μ road (refer to a "Yes" determination at step 1015 of FIG. 19, and a "Yes" determination at step 1020).

According to the above-mentioned aspect, the vehicle control unit performs the steering assist control to change the steering angle of each of steered wheels by changing the steering assist torque as the vehicle behavior stabilization control. Furthermore, when it is determined that the forward road is the left and right uniform μ road based on the front image, the magnitude of the steering assist torque is set to the first torque value which is relatively small. Therefore, when the traveling road of the vehicle is actually the left and right uniform μ road, even if the steering assist control starts to be performed inappropriately, it is possible to reduce a possibility that the behavior of the vehicle is degraded/reduced by the steering assist control. Furthermore, according to the above-mentioned aspect, when it is determined that the forward road of the vehicle is the split μ road based on the front image, the magnitude of the steering assist torque is set to the second torque value which is relatively large. Therefore, when the traveling road of the vehicle is the split μ road and the steering assist control starts to be performed, a yaw moment having a more appropriate magnitude can be generated. As a result, it is possible to increase stability of the behavior of the vehicle.

In one of aspects of the present invention apparatus, the vehicle control unit is configured to set the magnitude of the steering assist torque to a third torque value (Taq3) which is larger than the first torque value and is smaller than the second torque value (step 1910), when the forward road of the vehicle is determined to be neither the left and right uniform μ road nor the split μ road based on the front image (refer to a "Yes" determination at step 1015 of FIG. 19, a "No" determination at step 1020, and a "No" determination at step 1035 or a "No" determination at step 1015).

According to the above-mentioned aspect, when it is determined, based on the front image, that the forward road of the vehicle is neither the left and right uniform μ road nor the split μ road (that is, when the forward road of the vehicle is determined to be the undecidable road), the steering assist torque is set to the third torque value which is larger than the first torque value and is smaller than the second torque value. Therefore, when the vehicle behavior stabilization control is performed, the magnitude of the steering assist torque generated by the steering assist control is neither too large nor too small. Accordingly, it is possible to decrease a possibility that the stability of the behavior of the vehicle is degraded.

In the above description, the terms and/or the reference symbols used in the following descriptions regarding embodiments are added with parentheses to the elements of the present invention, in order to assist in understanding the present invention. However, the terms and/or the reference symbols should not be used to limit the scope of the invention.

DETAILED DESCRIPTION OF THE EMBODIMENT

First Embodiment

<Construction>

Figure 1:
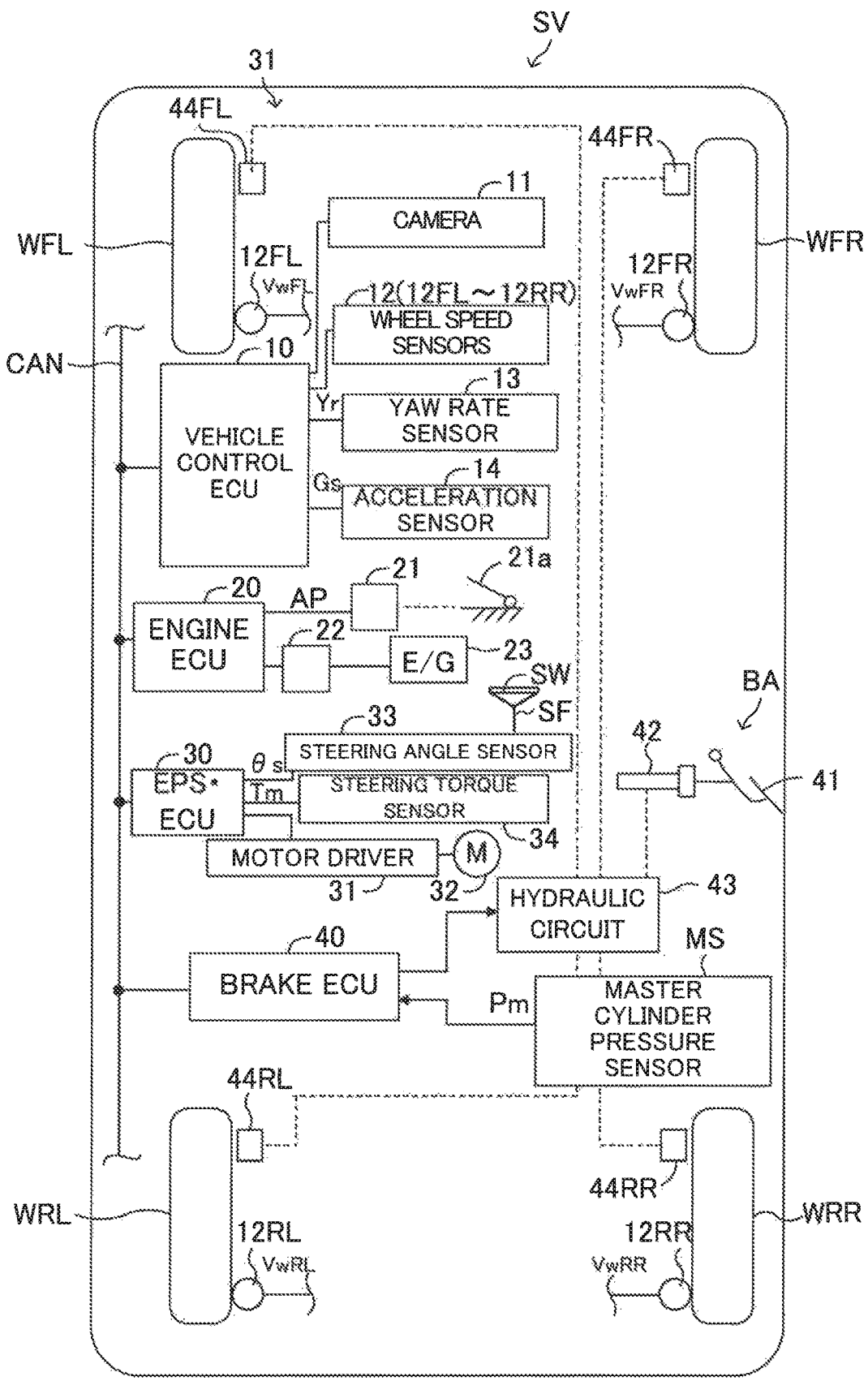
FIG. 1 is a schematic configuration diagram illustrating a vehicle comprising a vehicle control apparatus according to a first embodiment of the present invention.

A vehicle control apparatus (hereinafter, referred to as a "first control apparatus") according to a first embodiment of the present invention is installed in a vehicle SV shown in FIG. 1.

The first control apparatus comprises a vehicle control ECU 10, an engine ECU 20, an electric power steering ECU 30, and a brake ECU 40. Hereinafter, the electric power steering ECU 30 is referred to as an "EPS ECU 30".

Those ECUs are connected with each other via a CAN (Controller Area Network) so that they are capable of mutually exchanging (communicating) data. Each of the ECUs includes a microcomputer. The microcomputer includes a CPU, a ROM, a RAM, and an interface (I/F). The CPU is configured to realize various functions by executing instructions (programs, routines) stored in the ROM.

The vehicle control ECU 10 is connected to a camera 11, wheel speed sensors 12FL, 12FR, 12RL, and 12RR, a yaw rate sensor 13, and an acceleration sensor 14. The vehicle control ECU 10 is configured to receive detection signals which those sensors generate. Each of sensors may be connected to one or more of the ECUs other than the vehicle control ECU 10. In this case, the vehicle control ECU 10 receives via the CAN the detection signal or the output signal of the sensor from that ECU which is connected to the sensor.

The camera 11 includes a CCD camera which photographs (takes an image of) a view/landscape in front (ahead) of the vehicle SV to thereby obtain a front image. The front image is a photographed image (an image data of a front area of the vehicle SV) including an image of a road surface present in front (ahead) of the vehicle SV. The camera 11 transmits the front image to the vehicle control ECU 10.

The wheel speed sensor 12FL detects a wheel speed (hereinafter, referred to as a "left front wheel speed") of a left front wheel WFL to generate a signal indicative of the detected left front wheel speed VwFL. The wheel speed sensor 12FR detects a wheel speed (hereinafter, referred to as a "right front wheel speed") of a right front wheel WFR to generate a signal indicative of the detected right front wheel speed VwFR. The wheel speed sensor 12RL detects a wheel speed (hereinafter, referred to as a "left rear wheel speed") of a left rear wheel WRL to generate a signal indicative of the detected left rear wheel speed VwRL. The wheel speed sensor 12RR detects a wheel speed (hereinafter, referred to as a "right rear wheel speed") of a right rear wheel WRL to generate a signal indicative of the detected right rear wheel speed VwRR.

It should be noted that when the wheel speed sensors 12FL, 12FR, 12RL, and 12RR do not need to be distinguished from each other, each of them is referred to a "wheel speed sensor 12" hereinafter. Furthermore, when the wheels WFL, WFR, WRL, and WRR do not need to be distinguished from each other, each of them is referred to as a "wheel Wi" hereinafter. Furthermore, when the wheel speeds VwFL, VwFR, VwRL, and VwRR do not need to be distinguished from each other, each of them is referred as a "wheel speed Vwi" hereinafter.

The yaw rate sensor 13 detects a yaw rate of the vehicle SV to generate a signal indicative of the detected yaw rate Yr.

The acceleration sensor 14 detects an acceleration in a longitudinal direction of the vehicle SV to generate a signal indicative of the detected acceleration Gs. When the acceleration Gs is a negative value, a magnitude (an absolute value) of that acceleration Gs is indicative of deceleration.

The engine ECU 20 is connected to engine state amount sensors (not all of them are not shown) including an accelerator pedal operation amount sensor 21 and an engine actuator 22. The accelerator pedal operation amount sensor 21 detects an accelerator pedal operation amount (an accelerator opening degree) of an accelerator pedal 21*a* of the vehicle SV to generate a signal indicative of the detected accelerator pedal operation amount Ap.

The engine actuator 22 includes a throttle valve actuator for changing an opening degree of a throttle valve of an engine 23. The engine ECU 20 drives the engine actuator 22 based on the accelerator pedal operation amount Ap and amounts of the driving state (for example, an engine rotation speed) detected by the engine state amount sensors other than the accelerator pedal operation amount sensor 21. Thereby, the engine ECU 20 can change a torque (an engine generating torque) which the engine (internal combustion engine) 23 generates.

The engine generating torque is transmitted to drive wheels (in this embodiment, the left front wheel WFL and the right front wheel WFR) through a transmission (not shown). Therefore, the engine ECU 30 controls the engine actuator 22 to thereby be able to control a driving force supplied to the vehicle SV. Thereby, the engine ECU 30 can change an acceleration state (acceleration) of the vehicle SV.

It should be noted that if the vehicle SV is a hybrid vehicle, the engine ECU 20 changes a torque which at least any one of an engine and an electric motor, both serving as a driving source of the vehicle SV, generates to thereby be able to control the driving force of the vehicle SV. Furthermore, if the vehicle SV is an electric vehicle, the engine ECU 20 changes a torque which the electric motor serving as the driving source of the vehicle SV generates to thereby be able to control the driving force of the vehicle SV.

The EPS ECU 30 is a control unit of a well-known electric power steering system and is connected to a motor driver 31. The motor driver 31 is connected to a steering motor 32. The steering motor 32 is incorporated into a "steering mechanism including a steering wheel SW, a steering shaft SF, and an unillustrated gear mechanism for steering".

The steering motor 32 generates a torque using electric power supplied from the motor driver 31 to thereby be able to generate a steering assist torque to the steering mechanism or steer the left and right steered wheels using the generated torque. That is, the steering motor 32 can change a steering angle of the vehicle SV (also referred to as a "turning angle").

Furthermore, the EPS ECU 30 is connected to a steering angle sensor 33 and a steering torque sensor 34. The steering angle sensor 33 detects a steering angle of the steering wheel SW of the vehicle SV to generate a signal indicative of the detected steering angle θs. The steering torque sensor 34 detects a steering torque applied to the steering shaft SF due to operation of the steering wheel SW to generate a signal indicative of the detected steering torque Tm. Each of the steering angle θs and the steering torque Tm is defined so as to be (assume) a positive value when steering in a left turning direction of the vehicle SV is performed. Each of the steering angle θs and the steering torque Tm is defined to be (assume) a negative value when steering in a right turning direction of the vehicle SV is performed.

The EPS ECU 30 detects/obtains the steering torque applied to the steering wheel SW by a driver using the steering torque sensor 34 to drive the steering motor 32 based on the detected/obtained steering torque. The EPS ECU 30 drives the steering motor 32 to thereby apply the steering torque (the steering assist torque) to the steering mechanism. Thereby, the EPS ECU 30 can assist a steering operation (a steering wheel operation) of the driver.

In addition, when the EPS ECU 30 receives a steering instruction via the CAN from the vehicle control ECU 10, it drives the steering motor 32 in accordance with a target torque specified/determined based on that steering instruction. Thereby, the EPS ECU 30 causes the steering motor 32 to generate the steering assist torque equal to the target torque. That steering assist torque is different from the steering assist torque applied to assist/lighten the steering operation of the driver, but is the assist torque applied to the steering mechanism based on the steering instruction transmitted from the vehicle control ECU 10.

The brake ECU 40 is connected to a braking device BA, a master cylinder pressure sensor MS, and each of the wheel speed sensors 12FL, 12FR, 12RL, and 12RR.

The braking device BA includes a brake pedal 41, a master cylinder 42, a hydraulic circuit 43, and wheel cylinders 44FL, 44FR, 44RL, and 44RR. It should be noted that the hydraulic circuit 43 includes an unillustrated reservoir tank, an unillustrated oil pump, and unillustrated various valve devices and functions as a brake actuator. When the wheel cylinders 44FL, 44FR, 44RL, and 44RR do not need to be distinguished from each other, each of them is referred to as a "wheel cylinder 44*i*".

The master cylinder pressure sensor MS generates an output signal indicative of a pressure Pm (hereinafter, also referred to as a "master cylinder pressure Pm") in the master cylinder 42 driven in accordance with a depressing operation to the brake pedal 41 by the driver.

The braking device BA applies a braking force proportional to a pressure of each of the wheel cylinders 44FL to 44RR to each of the wheels WFL to WRR corresponding to each of the wheel cylinders 44FL to 44RR. Normally, the pressure of each of the wheel cylinders 44FL to 44RR is controlled in accordance with the master cylinder pressure Pm which varies depending on the depressing operation to the brake pedal 41 by the driver. That is, the brake ECU 40 controls the pressure of each of wheel cylinders 44FL to 44RR based on the detected master cylinder pressure Pm.

Furthermore, when necessary, the brake ECU 40 controls the oil pump and the various valve devices to thereby control the pressure in each of wheel cylinders 44FL to 44RR regardless of an amount of the depressing operation to the brake pedal 41 by the driver.

The brake ECU 40 is configured to perform an antilock brake control for eliminating/diminishing a lock state of each of the wheels (WFL, WFR, WRL, and WRR) when the vehicle SV is being braked. The antilock brake control is well known and accordingly, a brief description will be given below. Hereinafter, that antilock brake control is simply referred to as an "ABS control". The ABS control is a control belonging to a wheel slip control.

The brake ECU 40 calculates/obtains the wheel speed Vwi based on the signals transmitted from the wheel speed sensor 12 to calculate/obtain a slip ratio SAi of each of the wheels WFL, WFR, WRL, and WRR, every time a predetermined time elapses. The slip ratio SAi is one of index values indicative of a degree of instability of behavior of the vehicle SV. For example, the slip ratio SAi is calculated/obtained in accordance with the following expression (1). It should be noted that "Va" in the expression (1) is a reference speed. For example, the reference speed is a vehicle body speed extrapolated/calculated based on the fourth wheel speeds Vwi (=VwFL, VwFR, VwRL, and VwRR).

$$SAi=((Va-Vwi)/Va) \times 100\% \qquad (1)$$

When the slip ratio SAi has become larger than a predetermined ABS start threshold Th_abs while the vehicle SV is being braked, the brake ECU 40 determines that the wheel Wi whose slip ratio SAi has become larger than the predetermined ABS is in the lock state. The predetermined ABS start threshold Th_abs is a threshold for determining whether or not the ABS control is to be started. The brake ECU 40 determines "the wheel Wi whose slip ratio SAi has become larger than the predetermined ABS start threshold Th_abs" as an "ABS object wheel" to start to perform the ABS control for the ABS object wheel.

The brake ECU 40 controls the hydraulic circuit 43 to thereby reduce the braking pressure of the wheel cylinder 44i corresponding to the ABS object wheel Wi. Thereby, the braking force which has been applied to the ABS object wheel Wi is reduced. As a result, the slip ratio SAi of the ABS object wheel Wi is gradually reduced.

Thereafter, the brake ECU 40 repeatedly increases and decreases the braking pressure of the wheel cylinder 44i corresponding to the ABS object wheel Wi. Then, when a predetermined ABS termination condition becomes satisfied, the brake ECU 40 terminates/ends the ABS control. For example, the ABS termination condition is a condition to be satisfied when the following state has continued for a predetermined time or longer.

The state is a state where all of the slip ratios SAi of the wheels WFL, WFR, WRL, and WRR are smaller than "an ABS termination threshold Th_absend smaller than the ABS start threshold Th_abs", respectively.

In addition, when the wheel speed difference Vdif between the front left and front right wheels satisfies a predetermined condition within a predetermined period Pd1 which starts from a time point at which the brake ECU 40 has started to performed the ABS control to any one of the front left wheel WFL and the right front wheel WFR (that is, one of the front wheels), the brake ECU 40 determines that a traveling road (a road on which the vehicle SV is traveling) is the split μ road so as to adjust the braking force for the predetermined wheel Wi. The wheel speed difference Vdif is a difference value (=VwFR−VwFL) obtained by subtracting the left front wheel speed VwFL from the right front wheel speed VwFR.

The adjustment of the braking force performed while the ABS control is being performed is a type of the vehicle behavior stabilization control performed for providing/applying a yaw moment for stabilizing the behavior of the vehicle SV to the vehicle SV, and is hereinafter referred to as an "ABS sprit control". The ABS sprit control is well known (for example, refer to Japanese Patent Application Laid-Open No. H9-249111, Japanese Patent Application Laid-Open No. 2011-073575, Japanese Patent Application Laid-Open No. 2012-51456, and Japanese Patent Application Laid-Open No. 2013-18461).

Figure 2:
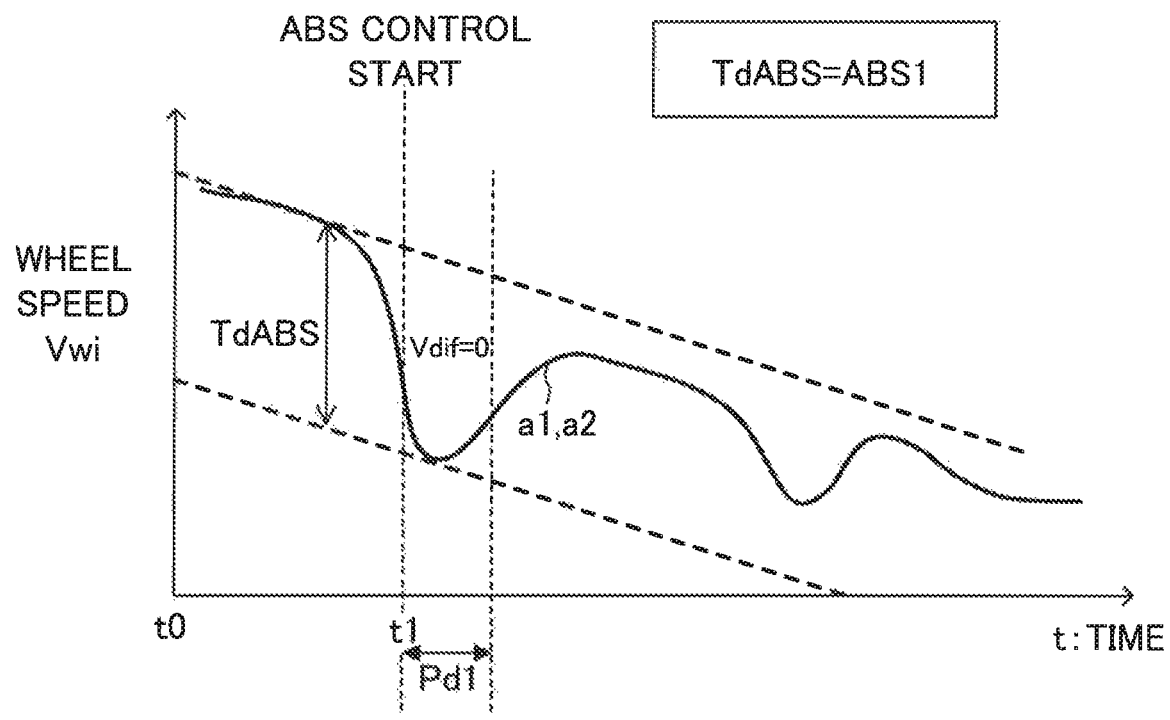
FIG. 2 is a graph showing change of a wheel speed of a left front wheel and change of a wheel speed of a right front wheel when an ABS control is being performed for the vehicle traveling on a left and right uniform μ road.

For example, when the vehicle SV traveling on "a left and right uniform μ road" is been braking, suppose that the ABS control for the left front wheel WFL and the right front wheel is started. The left and right uniform μ road is a road whose left side road surface μ and a right side road surface μ are substantially equal to each other. The left side road surface μ is a road surface μ of the road surface on which the left wheel of the vehicle SV is grounded. The right side road surface μ is a road surface μ of the road surface on which the right wheel of the vehicle SV is grounded. In this case, as shown by a line a1 and a line a2 in FIG. 2, the wheel speed difference Vdif seldom occurs within the predetermined period Pd1 which starts from a start time point t1 of the ABS control.

Figure 3:
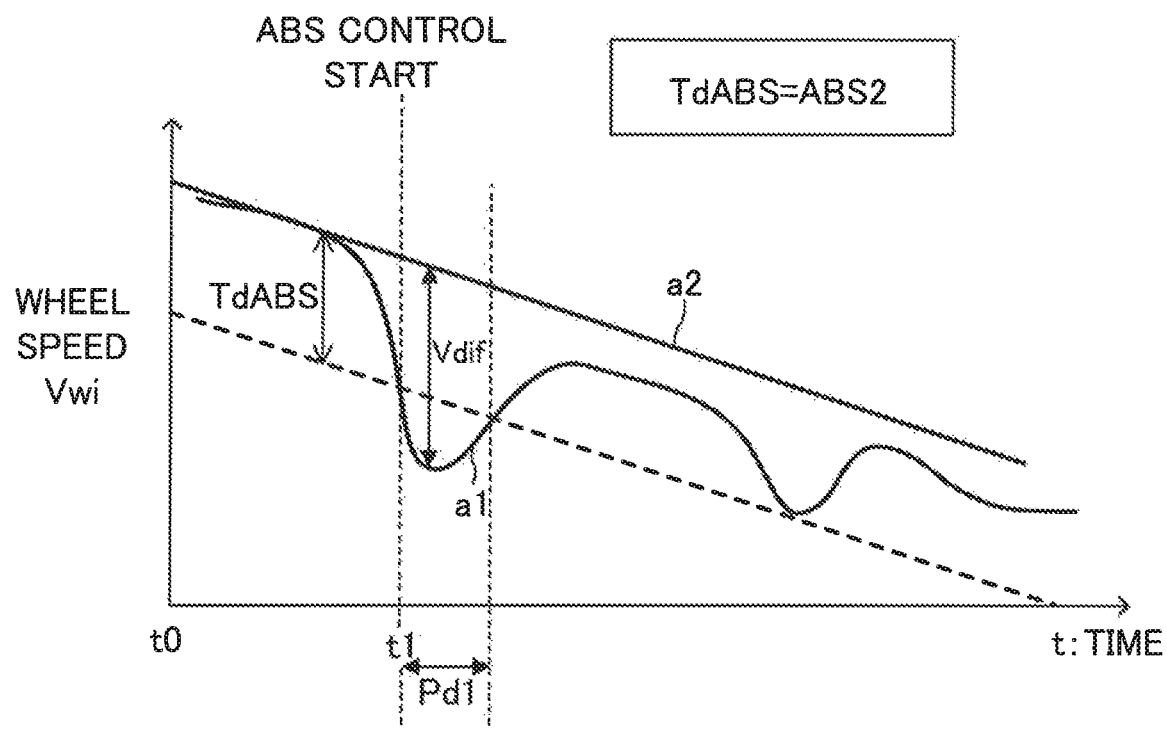
FIG. 3 is a graph showing change of the wheel speed of the left front wheel and change of the wheel speed of the right front wheel when the ABS control is to the vehicle traveling performed on a left low μ split road.

In contrast, suppose that the ABS control is performed for the left front wheel WFL while the vehicle SV traveling on "a left low μ split road" is being braked. The left low μ split road is a road whose left side road surface μ is smaller than the right side road surface μ. In this case, as shown by a line a1 and a line a2 in FIG. 3, a magnitude (the absolute value) of the wheel speed difference Vdif becomes larger within the predetermined period Pd1 which starts from the start time point t1 of the ABS control.

In this case, the braking force generated at the right front wheel WFR on the high μ road side is larger than the braking force generated at the left front wheel WFL on the low μ road side. Similarly, when the ABS control for the left rear wheel WRL on the low μ road side is performed, the braking force generated at the right front wheel WRR on the high μ road side is larger than the braking force generated at the left rear wheel WRL on the low μ road side. Therefore, the braking force difference between the left wheels and the right wheels causes an unnecessary yaw moment in the right turning direction. The unnecessary yaw moment reduces/degrade the stability of the behavior of the vehicle SV. Accordingly, there is a probability that the behavior of the vehicle SV while it is being braked becomes unstable.

In view of the above, when the absolute value |Vdif| of the wheel speed difference Vdif becomes larger than a split determination threshold TdABS within the predetermined period Pd1, the brake ECU 40 determines that the traveling road of the vehicle SV is the split μ road. The predetermined period Pd1 is a period from a start time point at which the ABS control to any one of the left front wheel WFL and the right front wheel WFR is started to a time point at which a fixed time elapses from that start time point.

When the brake ECU 40 determines that the traveling road of the vehicle SV is the split μ road and the left front wheel speed VwFL is smaller than the right front wheel speed VwFR, the brake ECU 40 determines that the traveling road of the vehicle SV is the left low μ split road. In this case, the brake ECU 40 performs the ABS sprit control to adjust the braking force applied to a predetermined wheel Wi (for example, the brake ECU 40 decreases the braking force applied to the right front wheel WFR) so as to reduce the unnecessary yaw moment in the right turning direction. Thereby, the behavior of the vehicle SV can be stabilized. The ABS sprit control is a type of the vehicle behavior stabilization control.

When the vehicle SV is traveling on a right low μ split road whose right side road surface μ is smaller than the left side road surface μ, the brake ECU 40 performs the ABS split control similar to the above ABS split control.

Figure 4:
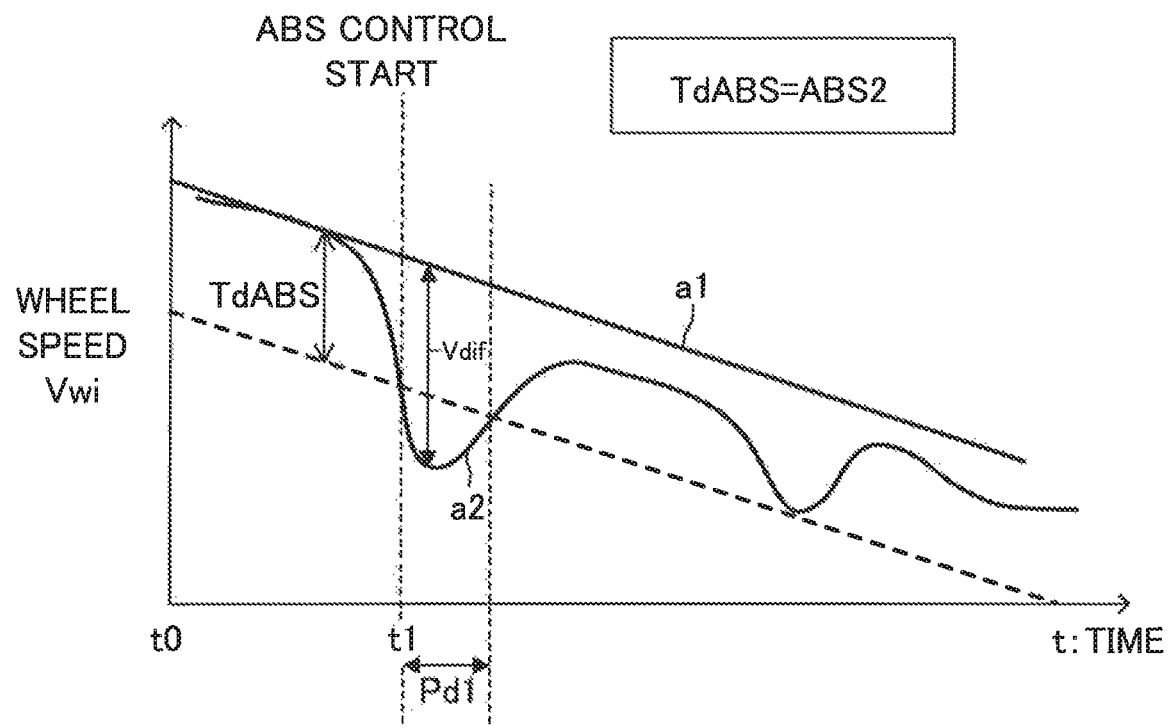
FIG. 4 is a graph showing change of the wheel speed of the left front wheel and change of the wheel speed of the right front wheel when the ABS control is being performed for the vehicle traveling on a right low μ split road.

More specifically, when the ABS control for the right front wheel WFR is started while the vehicle SV traveling on the right low μ split road is being braked, the absolute value |Vdif| of the wheel speed difference Vdif becomes larger within the predetermined period Pd1, as shown by a line a1 and a line a2 in FIG. 4. If this state happens, an unnecessary yaw moment in the left turning direction which reduces the stability of the behavior of the vehicle SV is generated in the vehicle SV due to the braking force difference between the left and right wheels.

In view of the above, when the absolute value |Vdif| of the wheel speed difference Vdif becomes larger than the split determination threshold TdABS within the predetermined period Pd1, the brake ECU 40 determines that the traveling road of the vehicle SV is the split μ road. In addition, when the right front wheel speed VwFR is smaller than the left front wheel speed VwFL, the brake ECU 40 determines that the traveling road of the vehicle SV is the right low μ split road. In this case, the brake ECU 40 performs the ABS sprit control to adjust the braking force applied to a predetermined wheel Wi (for example, the brake ECU 40 decreases the braking force applied to the left front wheel WFL) so as to reduce the unnecessary yaw moment in the left turning direction. Thereby, the behavior of the vehicle SV can be stabilized.

<Outline of Operation>

The wheel speed difference Vdif varies depending on "the difference in ground load between the left and right wheels" and "the difference in the unevenness between the left wheels grounding surface and the right wheels grounding surface". For this reason, if the split determination threshold TdABS has been set to an excessively small value, a case may occur where the absolute value |Vdif| of the wheel speed difference Vdif becomes larger than the split determination threshold TdABS even when the traveling road of the vehicle SV is not the split μ road. In this case, there is a probability that the ABS sprit control (the vehicle behavior stabilization control) is unnecessarily performed (i.e., ends up being performed) even when the traveling road of the vehicle SV is not the split μ road. In contrast, if the split determination threshold TdABS has been set to an excessively large value, it may take considerable time for the absolute value |Vdif| of the wheel speed difference V dif to exceed the split determination threshold Td ABS when the traveling road of the vehicle SV is the split μ road. Therefore, there is a probability that a start of the ABS split control (the vehicle behavior stabilization control) is delayed. Thus, it is understood that the split determination threshold TdABS be set to a value as appropriate as possible.

In view of the above, the vehicle control ECU 10 of the first control apparatus determines a road surface state (a road surface μ state) based on the front image obtained from the camera 11. The vehicle control ECU 10 changes the split determination threshold TdABS based/depending on the determined result of that road surface μ state.

More specifically, when the vehicle control ECU 10 determines that a forward road of the vehicle SV (i.e., a part of the travelling road ahead of the vehicle SV) is the left and right uniform μ road, the vehicle control ECU 10 sets the split determination threshold TdABS to a first ABS threshold (=ABS1). When the vehicle control ECU 10 determines that the forward road of the vehicle SV is the split μ road, the vehicle control ECU 10 sets the split determination threshold TdABS to a second threshold (=ABS2). When the vehicle control ECU 10 determines that the forward road is an undecidable road (in other words, the vehicle control ECU 10 can not determine whether the forward road of the vehicle SV is the left and right uniform μ road or the split μ road), the vehicle control ECU 10 sets the split determination threshold TdABS to a third ABS threshold (=ABS3). It should be noted that each of ABS1, ABS2, and ABS3 is a positive value.

The first to third ABS values have been determined in advance such that they satisfy the following relational expression (2). Thereby, as described later in detail, the vehicle control ECU 10 does not start the ABS split control (the vehicle behavior stabilization control) incorrectly/inappropriately and can start the ABS split control (the vehicle behavior stabilization control) at more appropriate timing.

$$ABS1 > ABS3 > ABS2 \qquad (2)$$

<Determination Method of the Road Surface μ State of the Forward Road Based on the Front Image>

Figure 5:
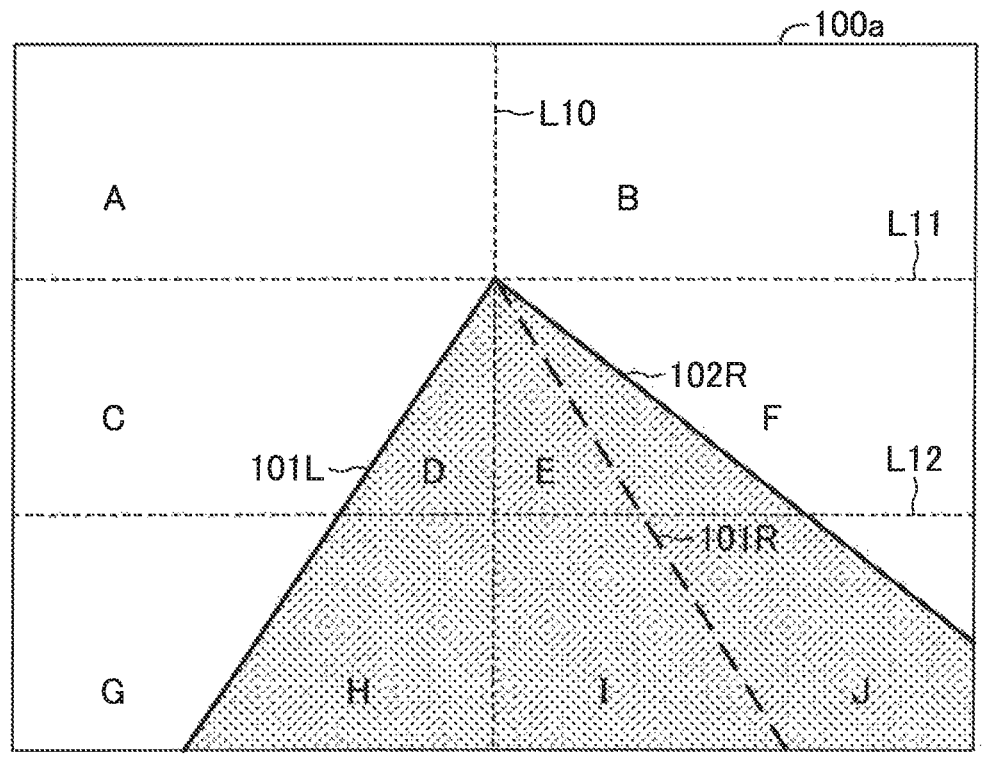
FIG. 5 illustrates a determination method of a road μ state based on a front image.

A determination method of the road surface μ state of the forward road based on the front image will be described. As shown in FIG. 5, the vehicle control ECU 10 divides the front image 100a obtained from camera 11 into a plurality of sections in such a manner each of the sections has a shape of rectangular respectively. That is, the front image 100a is equally divided into six sections (having the same rectangular shapes as each other) by the center line L10 and the two horizontal lines L11 and L12. The center line L11 passes through the center of the front image 100a in a horizontal direction of the front image 100a and extends in a vertical direction of the image. The horizontal lines L11 and L12 extend in the horizontal direction of the image. In addition, the front image 100a is divided by "lane markers defining the lane (an own lane, or a traveling lane) in which the vehicle SV is traveling". The lane makers includes a left lane marker 101L and a right lane marker 101R. In the example shown in FIG. 5, the right lane marker 101R is a white dashed line. As a result, the front image 100a is finally divided into ten sections/areas A to J. It should be noted that the lane marker 102R adjacent to the own lane is not used for dividing the front image 100a.

That is, the front image 100a is equally divided into an upper section, a middle section, and a lower section in order from upper to lower. The upper section of the front image 100a is divided into the section A and the section B in order from left to right. The middle section of the front image 100a is divided into the section C, the section D, the section E, and the section F in order from left to right. In addition, the lower section of the front image 100a is divided into the section G, the section H, the section I, and the section J in order from left to right.

Then, the vehicle control ECU 10 calculates a "high μ road surface feature ratio" for each of the sections A to J. The "high μ road surface feature ratio" is a ratio of a "high μ road surface feature" included in each of the sections A to J. In other words, the high μ road surface feature ratio" is a ratio of an area having the "high μ road surface feature" to an area of each of the sections A to J. The high μ road surface feature is a feature of "the road surface having a relatively high road surface μ". The high μ road surface feature is a feature represented by a color of the image, brightness of the image, roughness of the image, and the like. Then, the vehicle control ECU 10 determines the road surface μ state of the traveling lane (which is the own lane in which the vehicle SV is traveling) based on the high μ road surface ratio of each of the sections, as described below. It should be noted that such an image processing method and an image analysis method are well known (refer to Japanese Patent Application Laid-Open No. 2018-90161 and Japanese Patent Application Laid-Open No. 2018-95076).

The vehicle control ECU 10 specifies/selects sections which corresponds to the traveling lane (the own lane) of the vehicle SV from among the sections A to J. In the example shown in FIG. 5, the sections which corresponds to the own lane are the section D, the section E, the section H, and the section I. It should be noted that a position and an image range of the camera 11 have been set or designed in such a manner that the four sections D, E, H, and I which corresponds to the own lane are surely included in the front image 100a.

As will be described below, the vehicle control ECU 10 distinguishes (determines) which/what the forward road of the vehicle SV is, the left and right uniform μ road, the split μ road, or the undecidable road, based on (or using) the high μ feature ratios of the specified four sections.

More specifically, when both of "an image determination condition 1 and an image determination condition 2" which will be described below are satisfied, the vehicle control ECU 10 determines that the forward road of the vehicle SV is the left and right uniform μ road. It should be noted that the high μ road surface feature ratio of an arbitrary section X is represented/expressed as X1, in the following description. For example, the high μ road surface feature ratio of the section D is expressed as a "high μ road surface feature ratio D1", and the high μ road surface feature ratio of the section H is expressed as a "high μ road surface feature ratio H1".

The image determination condition 1 (which is a condition for determining whether or not the high μ road surface feature ratios on the front side and the rear side are uniform/the same as each other):

The image determination condition 1 is a condition to be satisfied when an absolute value (=|D1−H1|) of a difference between the high μ road surface feature ratio D1 and the high μ road surface feature ratio H1 is smaller than a first determination threshold Trth1 and an absolute value (=|E1−I1|) of a difference between the high μ road surface feature ratio E1 and the high μ road surface feature ratio I1 is smaller than the first determination threshold Trth1.

It should be noted that the first determination threshold Tth1 is a predetermined positive value.

The image determination condition 2 (which is a condition for determining whether or not the high μ road surface feature ratios on the right side and the left side are uniform/the same as each other):

The image determination condition 2 is a condition to be satisfied when an absolute value (=|D1−E1|) of a difference between the high μ road surface feature ratio D1 and the high μ road surface feature ratio E1 is smaller than the first determination threshold Trth1 and an absolute value (=|H1−I1|) of a difference between the high μ road surface feature ratio H1 and the high μ road surface feature ratio I1 is smaller than the first determination threshold Trth1.

According to the front image 100a shown in FIG. 5, both of "the image determination 1 and the image determination 2" are satisfied. Therefore, the vehicle control ECU 10 determines that the forward road of the vehicle SV is the left and right uniform μ road.

Figure 6:
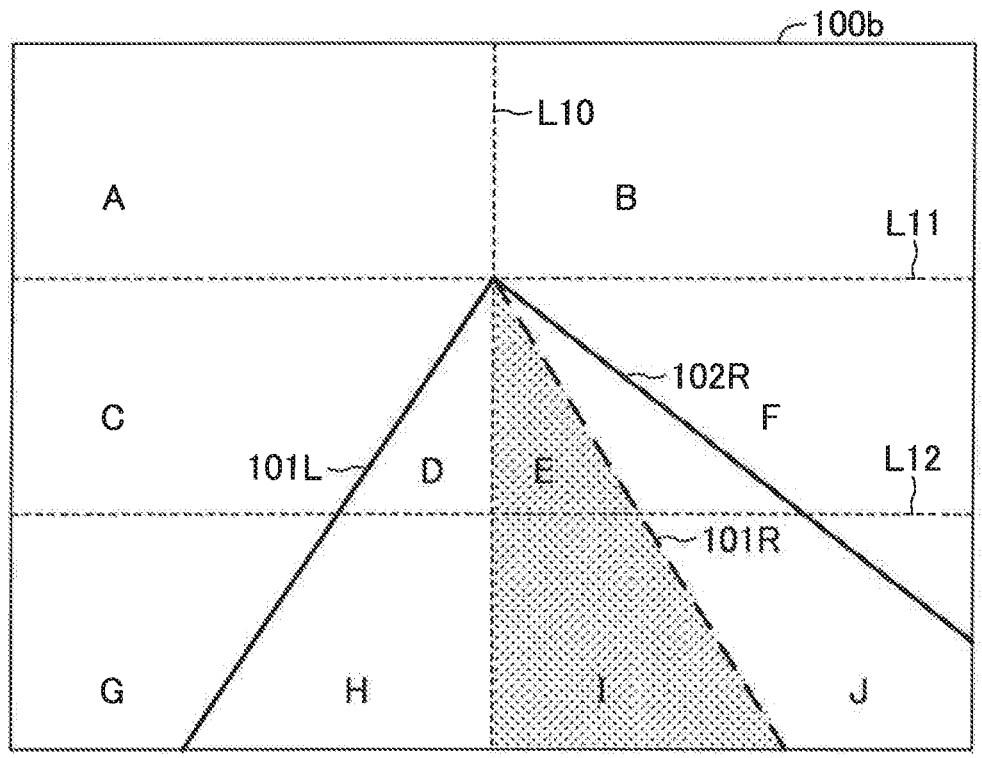
FIG. 6 illustrates the determination method of the road μ state based on the front image.
Figure 7:
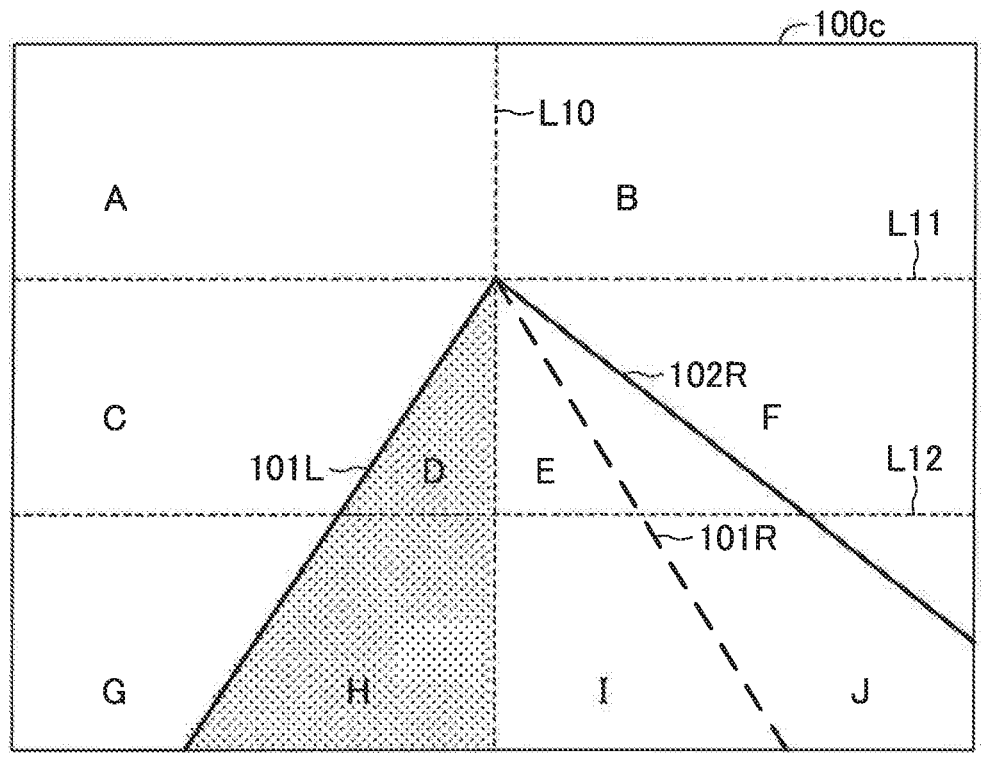
FIG. 7 illustrates the determination method of the road μ state based on the front image.

In contrast, as the front image 100b shown in FIG. 6 and the front image 100c shown in FIG. 7, the vehicle control ECU 10 determines that the forward road of the vehicle SV is the split μ road, when both of the above-described image determination condition 1 and an image determination condition 3 described below are satisfied The image determination condition 3 (which is a condition for determining whether or not the high μ road surface feature ratios on the right side and the left side are different from each other):

The image determination condition 3 is a condition to be satisfied when the absolute value (=|D1−E1|) of the difference between the high μ road surface feature ratio D1 and the high μ road surface feature ratio E1 is larger than the second determination threshold Trth2, and the absolute value (=|H1−I1|) of the difference between the high μ road surface feature ratio H1 and the high μ road surface feature ratio I1 is larger than the second determination threshold Trth2. It should be noted that the second determination threshold Trth2 has been set to a value equal to or larger than the first determination threshold Tth1.

The undecidable road is a road (road surface) which is neither a left and right uniform high μ road nor the split μ road. That is, the vehicle control ECU 10 determines that the forward road of the vehicle SV is the undecidable road, when the vehicle control ECU 10 determines that the forward road of the vehicle SV is neither "the left and right uniform μ road" nor "the split μ road". For example, as the front image 100d shown in FIG. 8, when the image determination condition 1 is not satisfied, the vehicle control ECU 10 determines that the forward road of the vehicle SV is the undecidable road. Furthermore, even when the image determination condition 1 is satisfied, the vehicle control ECU 10 determines that the forward road of the vehicle SV is the undecidable road if neither the image determination condition 2 nor the image determination condition 3 is satisfied.

<Reason why the First to Third ABS Thresholds are Set Such that the Above-Described the Relational Expression (2) Holds>

When it is determined that the forward road of the vehicle SV is the left and right uniform μ road based on the front image, the traveling road of the vehicle SV is highly likely to be the left and right uniform μ road. When the traveling road of the vehicle SV is the left and right uniform μ road, an absolute value |Vdif| of the wheel speed difference Vdif is made larger mainly due to "the difference between the ground load of the left wheel and the ground load of the right wheel" and "the difference between the unevenness of the grounding surface of the left wheel and the unevenness of the grounding surface of the right wheel", Accordingly, when the traveling road of the vehicle SV is the left and right uniform μ road, it is preferable that the traveling road of the vehicle SV be hardly determined to be the split μ road even if the absolute |Vdif| of the wheel speed difference Vdif has become relatively large. In other words, when the traveling road of the vehicle SV is actually the left and right uniform μ road, it is favorable that the absolute value |Vdif| of wheel speed difference Vdif should not exceed the split determination threshold TdABS. In view of the above, when it is determined that the traveling road of the vehicle SV is the left and right uniform μ road based on the front image, the split determination threshold TdABS is set to a first ABS threshold (=ABS1) which is a relatively large value.

In this manner, if the split determination threshold TdABS is set to be the relatively large value, it is unlikely that the traveling road of the vehicle SV is determined to be the split μ road when there is a high probability that the traveling road of the vehicle SV is the left and right uniform μ road. Accordingly, it is possible to prevent the ABS split control from being performed when the traveling road of the vehicle SV is actually the left and right uniform μ road.

When it is determined that the forward road of the vehicle SV is the split μ road based on the front image, the traveling road of the vehicle SV is highly likely to be the split μ road. When the traveling road of the vehicle SV is actually the split μ road, it is favorable that the traveling road of the vehicle SV be determined to be the split μ road as early as possible in order for the ABS control to be started at an appropriate time point. That is, in this case, it is favorable that the absolute value of the wheel speed difference Vdif become larger than (or exceed) the split determination threshold TdABS even when the absolute value |Vdif| of the wheel speed difference Vdif is relatively small. In view of the above, when it is determined that the forward road is the split μ road based on the front image, the split determination threshold TdABS is set to a second ABS threshold (=ABS2) which is a relatively small value.

In this manner, if the split determination value TdABS is set to the relatively small value, the absolute value |Vdif| of the wheel speed difference Vdif becomes larger than the split determination threshold TdABS at a time point before the absolute value |Vdif| of the wheel speed difference Vdif becomes considerably large. Therefore, when there is a high possibility that the traveling road of the vehicle SV is the split μ road, a possibility that the traveling road of the vehicle SV is properly determined to be the split μ road is made high. Accordingly, when the traveling road of the vehicle SV is actually the split μ road, the ABS split control can be surely performed in an appropriate period.

Figure 8:
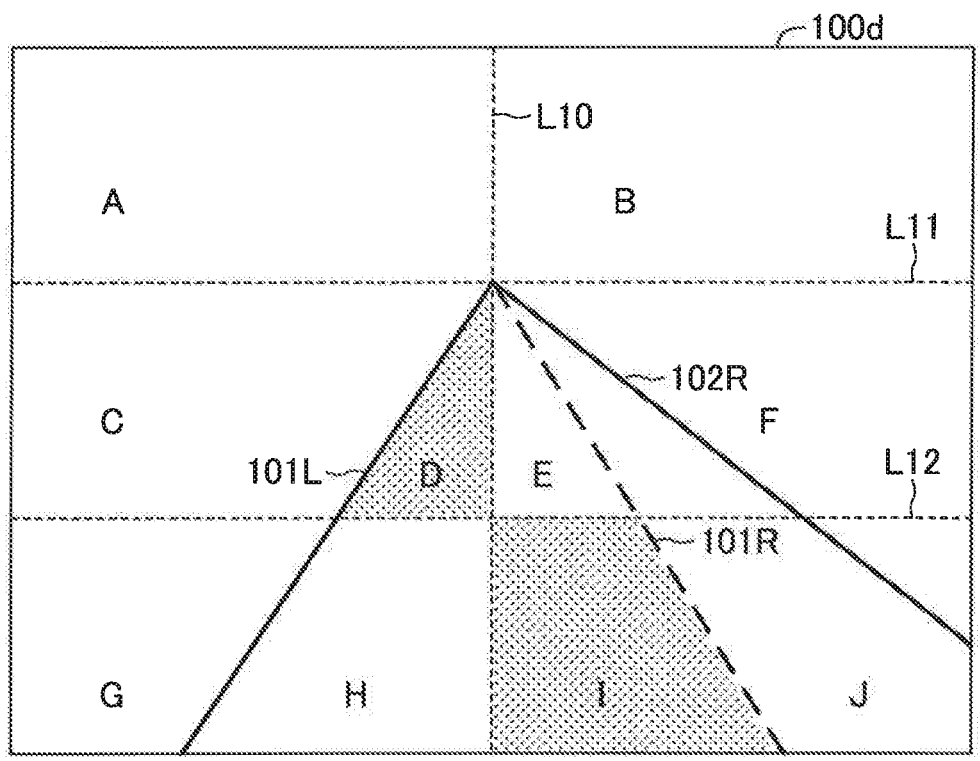
FIG. 8 illustrates the determination method of the road μ state based on the front image.

When it is determined that the forward road of the vehicle SV is the undecidable road based on the front image, the traveling road of the vehicle SV is often an "uneven μ road" as shown in FIG. 8, for example. The uneven μ road is a road (a road surface) on which a part of the low μ road and a part of the high μ road are present unevenly/randomly.

When the vehicle SV is actually traveling on the uneven μ road, the traveling road of the vehicle SV changes from the right low μ split road to the left low μ split road, and thereafter, the traveling road of the vehicle SV changes from the left low μ split road to the right low μ split road, within a short period. In this case, the left front wheel speed VwFL and the right front wheel speed VwFR change, as shown by a line a1 and a line a2 in FIG. 9.

Figure 9:
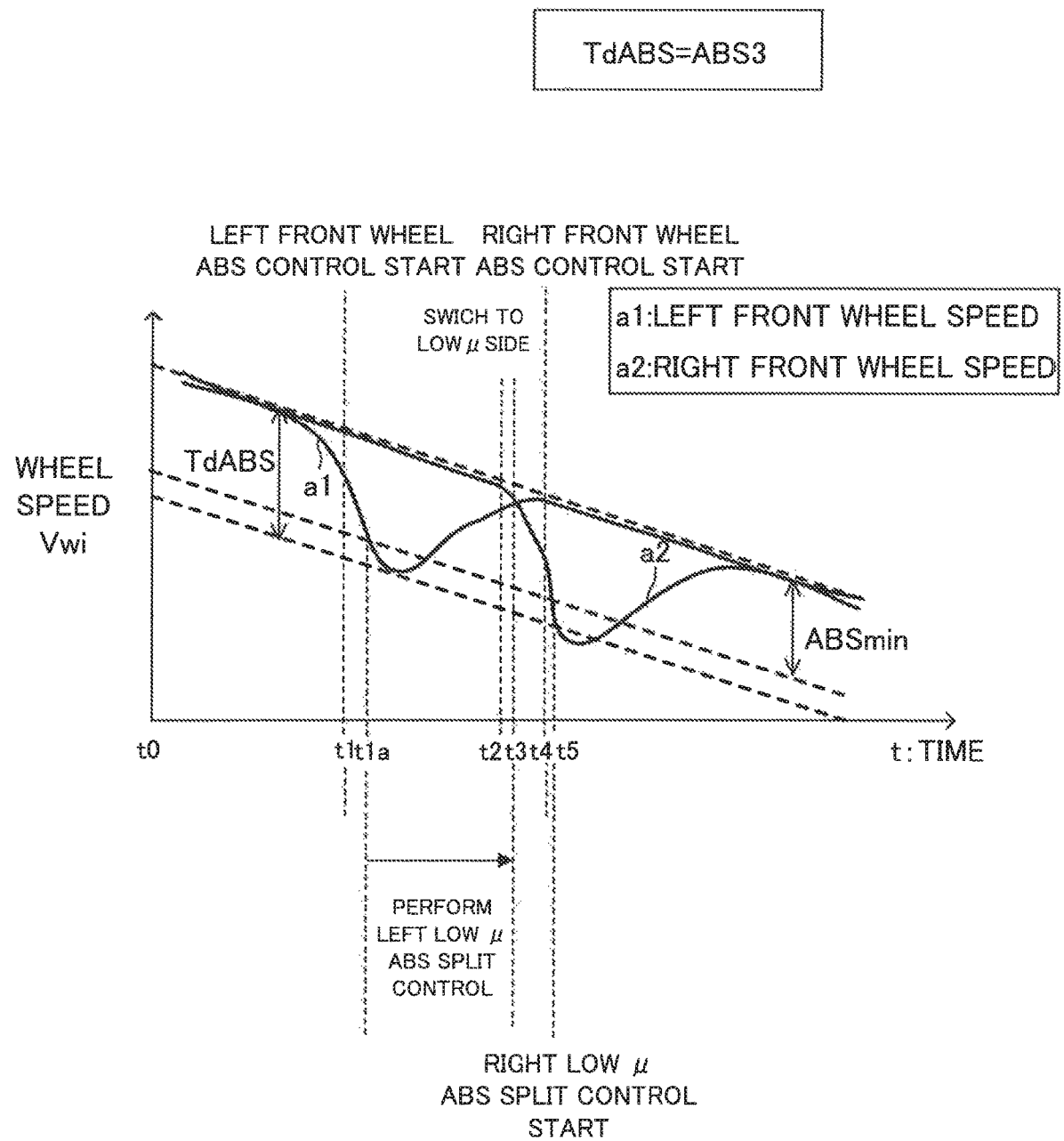
FIG. 9 is a graph showing change of the wheel speed of the left front wheel and change of the wheel speed of the right front wheel when the ABS control is being performed for the vehicle traveling on an uneven μ road.

Here, it is assumed that the split determination threshold TdABS has been set to an excessively small value ABS min shown in FIG. 9. In this case, the traveling road of the vehicle SV is determined to be the left low μ split road at a time point t1a. Thus, the ABS split control for the left low μ split road is started at the time point t1a. Then, at a time point t2 which is within a period in which the ABS split control for the left low μ split road is being performed, a case may occur where the traveling road of the vehicle SV switches over from the left low μ split road to the right low μ split road. However, the ABS split control for the left low μ split road is continuously performed until a time point t3 at which the absolute value |Vdif| of the wheel speed difference Vdi becomes equal to or smaller than a "relatively small split control termination threshold". Thereafter, at a time point t5, the absolute value |Vdif| of the wheel speed difference Vdi becomes equal to or larger than the value ABS min. Thus, at the time point t5, the traveling road of the vehicle SV is determined to be the right low μ split road and the ABS split control for the right low μ split road is started.

As understood from the above descriptions, in the period from the time point t2 to the time point t3, although the traveling road of the vehicle SV is the right low μ split road, the ABS sprit control for the left low μ split road is performed. For this reason, there is a high possibility that the behavior of the vehicle SV becomes unstable during that period. Therefore, when the traveling road of the vehicle SV is the "uneven μ road", it is favorable that the split determination threshold should not be excessively small.

On the other hand, when it is determined that the forward road of the vehicle SV is the undecidable road based on the front image, the ABS split control is hard to be performed, if the split determination threshold TdABS has been set to an excessively large value. Therefore, when the traveling road of the vehicle SV is actually the "uneven μ road", it is favorable that the split determination threshold TdABS should not be excessively large.

For this reason, when it is determined that the forward road of the vehicle SV is the undecidable road based on the front image, the split determination threshold Td ABS is set to a third ABS threshold (=ABS3) having a magnitude between the first ABS threshold and the second ABS threshold.

<Specific Operation>

Figure 10:
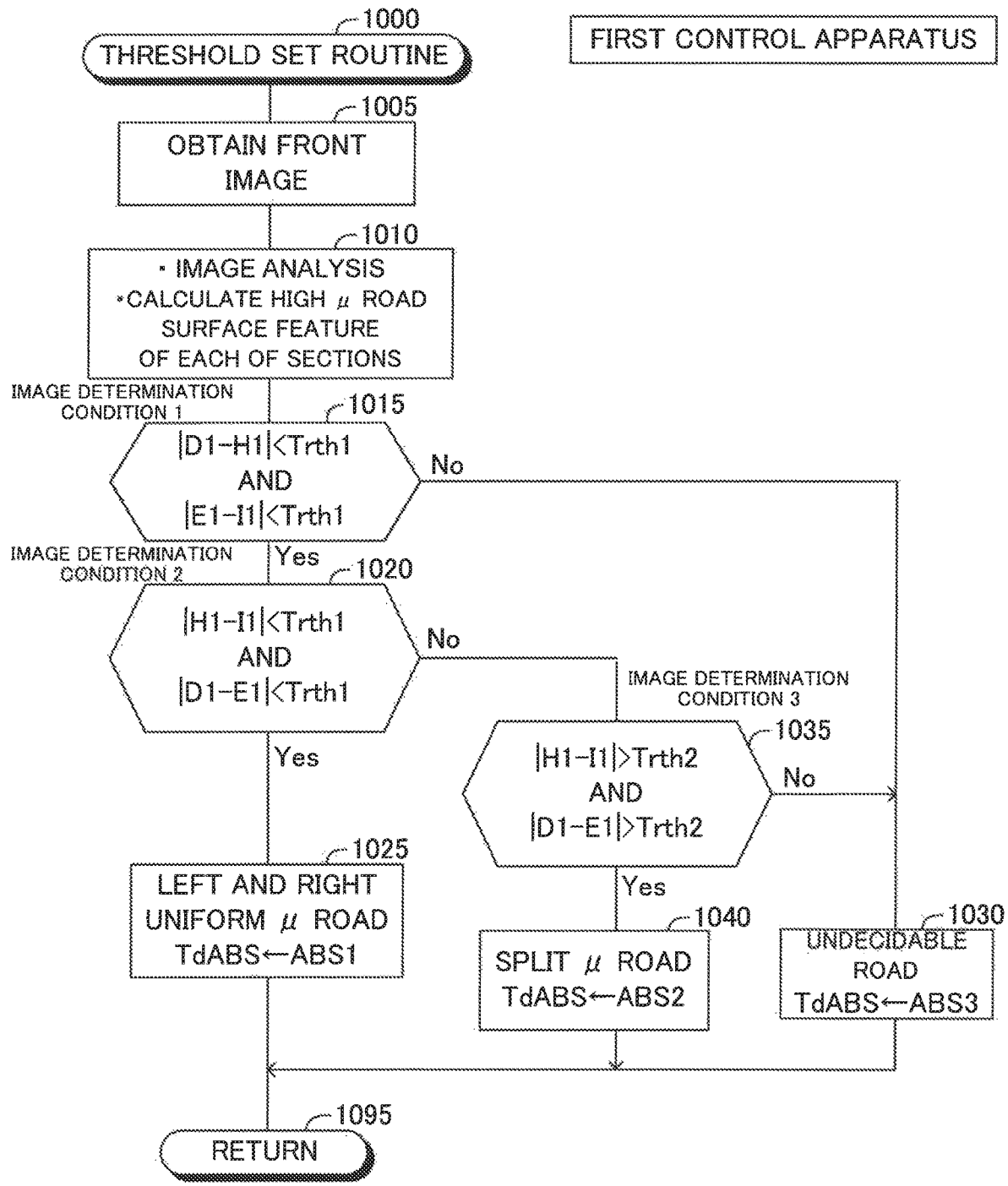
FIG. 10 is a flowchart showing a routine executed by a CPU of a vehicle control ECU shown in FIG. 1.

The CPU of the vehicle control ECU 10 executes a routine shown by a flowchart in FIG. 10, every time a predetermined time elapses.

Therefore, when an appropriate timing arrives, the CPU starts processing from step 1000 of FIG. 10 to sequentially execute the processes of steps 1005 and 1010 described below, and thereafter proceeds to step 1015.

Step 1005: the CPU obtains the front image which the camera 11 has photographed/acquired from camera 11.

Step 1010: as described above, the CPU executes the image processing and the image analysis for the front image to thereby calculate/obtain the high μ road surface feature ratio of each of the section D, the section E, the section H, and the section I. These sections correspond to the own lane included in the front image.

At step 1015, the CPU determines whether or not the above-described image determination condition 1 is satisfied.

When the image determination condition 1 is satisfied, the CPU makes a "Yes" determination at step 1015 and proceeds to step 1020 to determine whether or not the above-described determination condition 2 is satisfied.

When the image determination condition 2 is satisfied, the CPU makes a "Yes" determination at step 1020 and proceeds to step 1025 to determine that the forward road is the left and right uniform μ road and set the split determination threshold TdABS to the first ABS threshold (=ABS1). Thereafter, the CPU proceeds to step 1095 to tentatively terminate the present routine.

In contrast, when the image determination condition 1 is not satisfied, the CPU makes a "No" determination at step 1015 to proceed to step 1030. At step 1030, the CPU determines that the forward road is the undecidable road and sets the split determination threshold TdABS to the third ABS threshold (=ABS3). Thereafter, the CPU proceeds to step 1095 to tentatively terminate the present routine.

When the image determination condition 2 is not satisfied at the time point at which the process of the step 1020 is executed, the CPU makes a "No" determination at step 1020 and proceeds to step 1035 to determine whether or not the above-described image determination condition 3 is satisfied.

When the image determination condition 3 is satisfied, the CPU makes a "Yes" determination at step 1035 to proceed to step 1040. Then, at step 1040, the CPU determines that the forward road is the split μ road and sets the split determination threshold TdABS to the second ABS threshold (=ABS2). Thereafter, the CPU proceeds to step 1095 to tentatively terminate the present routine.

In contrast, when the image determination condition 3 is not satisfied, the CPU makes a "No" determination at step 1035 to proceed to step 1030. Then, at step 1030, the CPU determines that the forward road is the undecidable road and sets the split determination threshold TdABS to the third ABS threshold (=ABS3). Thereafter, the CPU proceeds to step 1095 to tentatively terminate the present routine.

Figure 11:
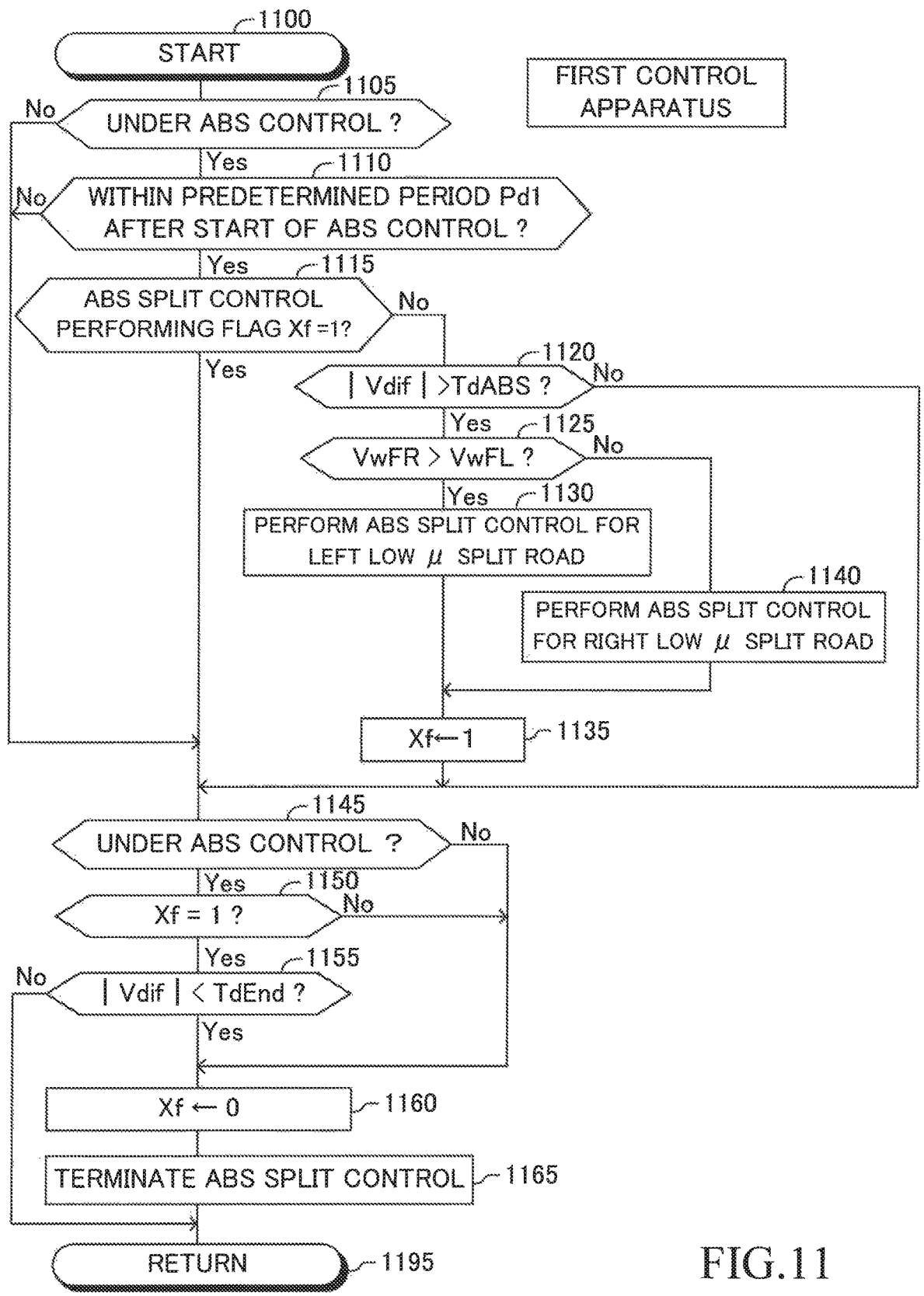
FIG. 11 is a flowchart showing a routine executed by the CPU of the vehicle control ECU shown in FIG. 1.

Furthermore, the CPU executes a routine shown by a flowchart in FIG. 11, every time a predetermined time elapses.

Therefore, when an appropriate timing arrives, the CPU starts processing from step 1100 and proceeds to step 1105 to determine whether or not the ABS control is being performed for at least any one of the left front wheel WFL and the right front wheel WFR. In other words, the CPU determines whether or not the current time point is within a period from a time point at which the ABS start condition becomes satisfied to a time point at which the ABS termination condition becomes satisfied. That is, the CPU determines whether or not a braking force control by the ABS control is being performed for at least any one of the left front wheel WFL and the right front wheel WFR.

When the ABS control is not being performed, the CPU makes a "No" determination at step 1105 to proceed to step 1145.

In contrast, when the ABS control is being performed, the CPU makes a "Yes" determination at step 1105 and proceeds to step 1110 to determine whether or not the current time point is within the predetermined period Pd1 which starts from the start time point of the ABS control. When the current time point is not within the predetermined period Pd1, the CPU makes a "No" determination at step 1110 to proceed to step 1145.

When the current time point is within the predetermined period Pd1, the CPU makes a "Yes" determination at step 1110 and proceeds to step 1115 to determine whether or not a value of an ABS split control performing flag Xf is "1".

The flag Xf indicates that the ABS split control is being performed when the value of the flag Xf is "1". That is, the flag Xf indicates that any one of the ABS split control for the left low μ split road and the ABS split control for the right low μ split road is being performed when the value of the flag Xf is "1". The flag Xf is set to "0" in an initialization routine (not shown) executed by the CPU when an ignition key switch (not shown) installed in the vehicle SV is changed from the OFF position to the ON position. Furthermore, the flag Xf is also set to "0" when the ABS control is terminated (ended) (refer to step 1160 described below). The flag Xf is set to "1" at step 1135 described below.

When the value of the flag Xf is "1", the CPU makes a "Yes" determination at step 1115 to proceed to step 1145. In contrast, when the value of the flag Xf is not "1" (that is, when the value of the flag Xf is "0"), the CPU proceeds to step 1120 to determine whether or not the absolute value |Vdif| of the wheel speed difference Vdif is larger than the split determination threshold TdABS. That split determination threshold TdABS has been set to any one of the first ABS threshold (=ABS1), the second ABS threshold (=ABS2), and the third ABS threshold (=ABS3) through the routine of FIG. 10 described above.

When the absolute value |Vdif| of the wheel speed difference Vdif (=VwFR−VwFL) is larger than the split determination threshold TdABS, the CPU makes a "Yes" determination at step 1120 and proceeds to step 1125 to determine whether or not the right front wheel speed VwFR is larger than the left front wheel speed VwFL.

When the right front wheel speed VwFR is larger than the left front wheel speed VwFL, the CPU makes a "Yes" determination at step 1125 and proceeds to step 1130 to perform the above-described ABS split control for the left low μ split road. Thereafter, the CPU proceeds to step 1135 to set the value of the flag Xf to "1", and proceeds to step 1145.

In contrast, when the right front wheel speed VwFR is not larger than the left front wheel speed VwFL (that is, when the left front wheel speed VwFL is larger than the right front wheel speed VwFR), the CPU makes a "No" determination at step 1125 and proceeds to step 1140 to perform the above-described ABS split control for the right low μ split road. Thereafter, the CPU proceeds to step 1135 to set the value of the flag Xf to "1", and proceeds to step 1145.

Furthermore, at step 1120, when the absolute value |Vdif| of the wheel speed difference Vdif is not larger than the split determination threshold TdABS, the CPU makes a "No" determination at step 1120 to proceed to step 1145.

In this manner, when the absolute value |Vdif| of the wheel speed difference Vdif becomes larger than the split determination threshold TdABS within the predetermined period Pd1 which starts from the start time point of the ABS control, the ABS split control is started (that is, any one of the ABS sprit control for the left split μ road and the ABS sprit control for the right split μ road is started).

Furthermore, at step 1145, the CPU determines again whether or not the ABS control is being performed for at least any one of the left front wheel WFL and the right front wheel WFR. When the ABS control is being performed, the CPU makes a "Yes" determination at step 1145 and proceeds to step 1150 to determine whether or not the value of the flag Xf is "1".

When the value of the flag Xf is "1", the CPU makes a "Yes" determination at step 1150 and proceeds to step 1155 to determine whether or not the absolute value |Vdif| of the wheel speed difference Vdif is smaller than the determination termination threshold TdEnd. That determination termination threshold TdEnd is set to a value which is a positive value and is smaller than any split determination threshold TdABS (that is, the threshold TdEnd is a value smaller than ABS3).

When the absolute value |Vdif| of the wheel speed difference Vdif is not smaller than the determination termination threshold TdEnd, the CPU makes a "No" determination at step 1155 and directly proceeds to step 1195 to tentatively terminate the present routine.

In contrast, when the absolute value |Vdif| of the wheel speed difference Vdif is smaller than the determination termination threshold TdEnd, the CPU makes a "Yes" determination at step 1155 and sequentially executes the processes of steps 1160 and 1165 described below. Thereafter, the CPU proceeds to step 1195 to tentatively terminate the present routine.

Step 1160: the CPU sets the value of the flag Xf to "0".
Step 1165: the CPU terminates the ABS split control which is being performed at the current time point.

It should be noted that when the CPU makes a "No" determination at step 1145, the CPU executes steps 1160 and 1165, and thereafter, proceeds to step 1195. Similarly, when the CPU makes a "No" determination at step 1150, the CPU executes steps 1160 and 1165, and thereafter, proceeds to step 1195.

As mentioned above, the first control apparatus determines/specifies which the forward road is, the left and right uniform μ road, the split μ road, or the undecidable road, using the front image, so as to set the split determination threshold TdABS based on the determined/specified result. Therefore, according to the first control apparatus, it is possible to prevent the ABS split control from being performed inappropriately when the vehicle SV is traveling on the left and right uniform μ road. Furthermore, according to the first control apparatus, when the vehicle SV is traveling on the split μ road, the ABS split control can be surely performed appropriately (at an early appropriate timing).

Second Embodiment

The vehicle control apparatus (hereinafter, referred to a "second control apparatus" in some cases) according to the second embodiment of the present invention differs from the first control apparatus only in the following point.

The second control apparatus determines the road surface μ state of the forward road based on the front image, and thereafter, sets a split determination threshold TdTRC to any one of values different from each other in accordance with the determined result. The split determination threshold TdTRC is a value used to determine whether or not a TRC split control described later is performed.

The different point of the second control apparatus from the first control apparatus will next be mainly described. It should be noted that the second control apparatus may or may not be configured to perform "the ABS control and the ABS split control" which the first control apparatus performs.

The brake ECU 40 of the second control apparatus is configured to perform a traction control to prevent a slip of each of drive wheels when the vehicle SV is accelerated (including when the vehicle starts to move). In this embodiment, the drive wheels are the left front wheel WFL and the right front wheel WFR. The traction control is well known, ant thus, will be briefly described below. Hereinafter, the traction control is simply referred to as a "TRC control". The TRC control is a control belonging to the wheel slip control. It should be noted that the "slip of the wheel Wi (a slip state)" includes a state of the wheel Wi occurring when the wheel Wi leaves (is apart from) the road surface and a state of the wheel Wi occurring when the wheel Wi is in acceleration slip state in which the wheel Wi slips on the road surface due to acceleration of the vehicle SV.

The brake ECU 40 calculates/obtains the wheel speed Vwi based on the signals transmitted from the wheel speed sensor 12, and calculates/obtains a slip ratio SBi of each of the wheels Wi, every time the predetermined time elapses. For example, the slip ratio SBi is calculated/obtained in accordance with the following expression (3).

$$SBi=((Vwi-Va)/Va)\times 100\% \qquad (3)$$

When the vehicle SV is accelerated and the slip ratio SBi becomes larger than a predetermined TRC start threshold Th_trc, the brake ECU 40 determines that the "drive wheel Wi whose slip ratio SBi has become larger than the predetermined TRC start threshold Th_trc" is in the slip state. The brake ECU 40 determines "the drive wheel Wi determined to be in the slip state" as a "TRC object wheel Wi" and starts the TRC control for the TRC object wheel Wi.

The brake ECU 40 controls the hydraulic circuit 43 to thereby increase the braking pressure of the wheel cylinder 44i corresponding to the TRC object wheel Wi. Thereby, the braking force is applied to the TRC object wheel Wi, and thus, the slip ratio SBi of the TRC object wheel Wi is gradually reduced.

Thereafter, the brake ECU 40 repeatedly increases and decreases the braking pressure of the wheel cylinder 44i corresponding to the TRC object wheel Wi. When a predetermined TRC termination condition becomes satisfied, the brake ECU 40 terminates/ends the TRC control. For example, the TRC termination condition is a condition to be satisfied when the following state has continued for a predetermined period or longer.

The state is a state in which all the slip ratios SBi of the wheels WFL, WFR, WRL, and WRR are smaller than "a TRC termination threshold Th_trcend smaller than the TRC start threshold Th_trc".

It should be noted that when the vehicle SV is a vehicle capable of independently controlling the drive torque applied to each of the wheels Wi, the second control apparatus controls the driving torque distributed/applied to the TRC object wheel Wi, independently, in such a manner that the slip ratio SBi of the TRC object wheel Wi behaves in the manner described above.

In addition, when the wheel speed difference Vdif (=VwFR−VwFL) between the front left and right wheels satisfies a predetermined condition within a predetermined period Pd1 which starts from a start time point of the TRC control to any one of the drive wheels (that is, the front left wheel WFL and the right front wheel WFR), the brake ECU 40 determines that the traveling road of the vehicle SV is the split μ road to adjust the braking force of the predetermined wheel Wi.

The adjustment of the braking force and the driving force performed when that TRC control is being performed is a type of the above-described vehicle behavior stabilization control, and is hereinafter referred to as a "TRC sprit control". Such a "TRC sprit control" is well known (for example, refer to Japanese Patent Application Laid-Open No. H05-097023, Japanese Patent Application Laid-Open No. H07-251654, and Japanese Patent Application Laid-Open No. 2007-209068).

Figure 12:
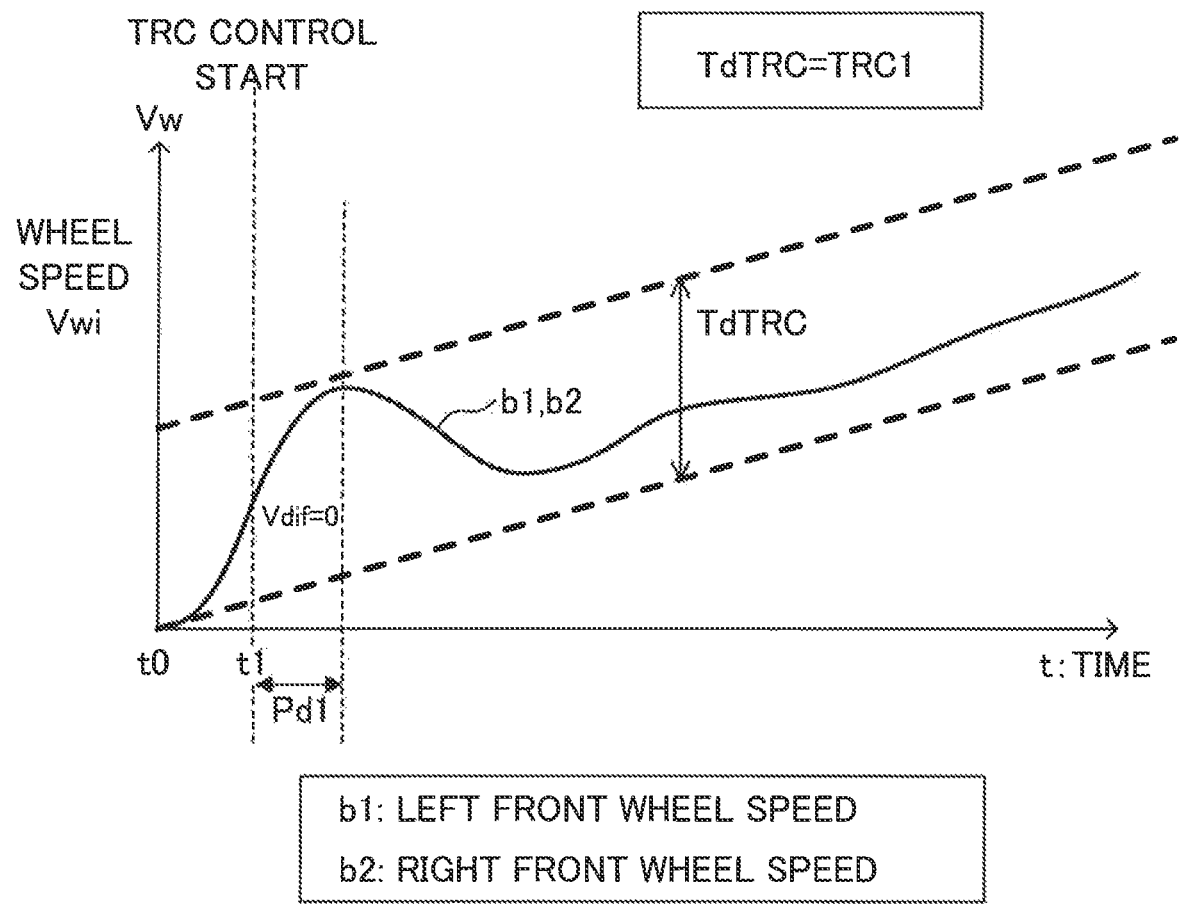
FIG. 12 is a graph showing change of a wheel speed of a left drive wheel and change of a wheel speed of a right drive wheel when a TRC control is performed on the left and right uniform μ road.

For example, when the vehicle SV traveling on the left and right uniform μ road has been accelerated, suppose that the TRC control for both of the left front wheel WFL and the right front wheel WFR is started. In this case, as shown by a line b1 and a line b2 in FIG. 12, it is unlikely that the wheel speed difference Vdif occurs within the predetermined period Pd1 which starts from a start time point t1 of the TRC control.

Figure 13:
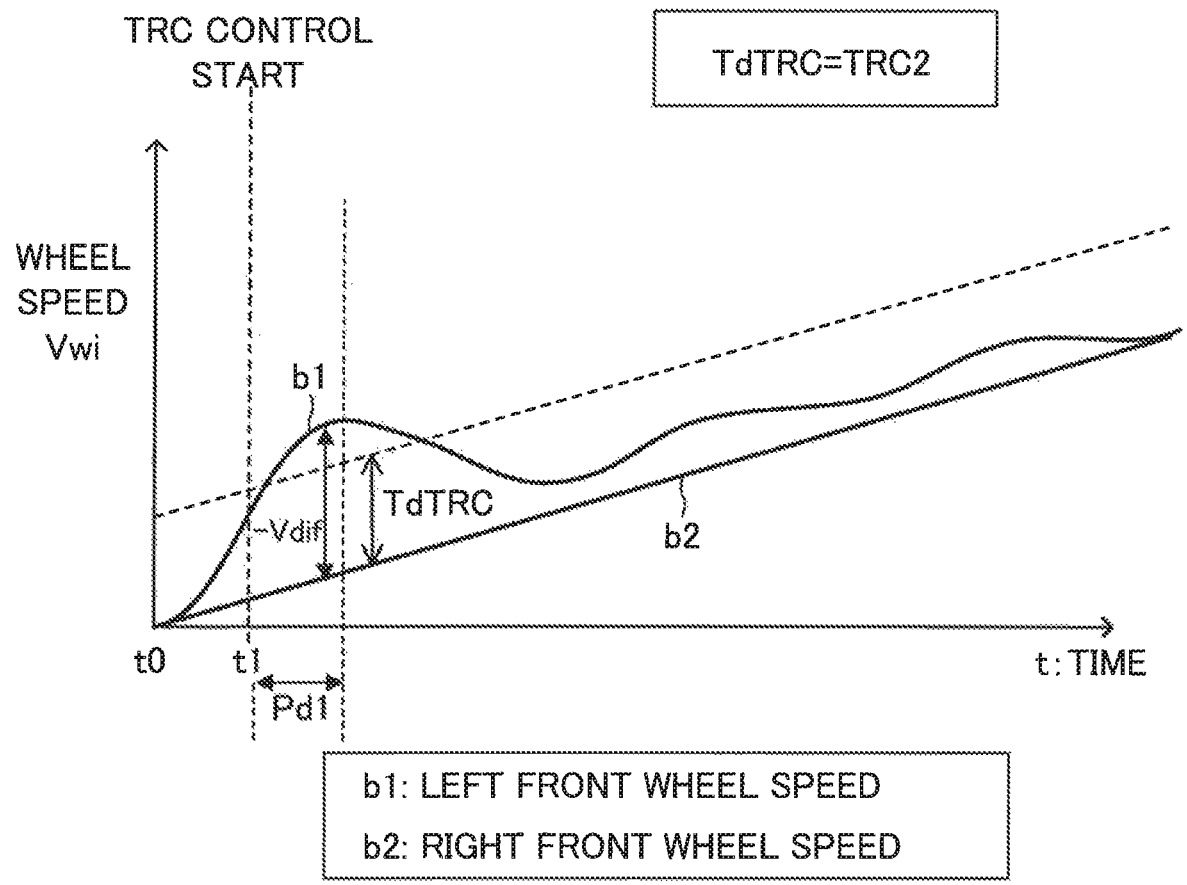
FIG. 13 is a graph showing change of the wheel speed of the left drive wheel and change of the wheel speed of the right drive wheel when the TRC control is performed for the vehicle traveling on the left low μ split road.

In contrast, suppose that the TRC control for the left front wheel WFL is performed when the vehicle SV traveling on the left low μ split road is been accelerated. In this case, as shown by a line b1 and a line b2 in FIG. 13, a magnitude (an absolute value) of the wheel speed difference Vdif becomes larger within the predetermined period Pd1 which starts from the start time point t1 of the TRC control.

In this case, the driving force generated at the right front wheel WRL on the high μ road side is larger than the driving force generated at the left front wheel WFL on the low μ road side. For this reason, an unnecessary yaw moment in the left turning direction is generated in the vehicle SV due to the driving force difference between the left and right wheels. The unnecessary yaw moment degrades/reduces the stability of the behavior of the vehicle SV, and thus, there is a probability that the behavior of the vehicle SV while it is being accelerated becomes unstable.

In view of the above, when the absolute value |Vdif| of the wheel speed difference Vdif becomes larger than a split determination threshold TdTRC within the predetermined period Pd1 and the left front wheel speed VwFL is larger than the right front wheel speed VwFR, the brake ECU 40 determines that the traveling road of the vehicle SV is the left low μ split road. In this case, the brake ECU 40 performs the TRC sprit control to adjust the braking force applied to a predetermined wheel Wi (e.g., the left front wheel WFL) so as to decrease/reduce the unnecessary yaw moment in the left turning direction. For example, the brake ECU 40 increases the braking force applied to the left front wheel WFL.

Furthermore, when the vehicle SV is traveling on the right low μ split road, the brake ECU 40 performs the TRC split control similar to the above TRC split control.

Figure 14:
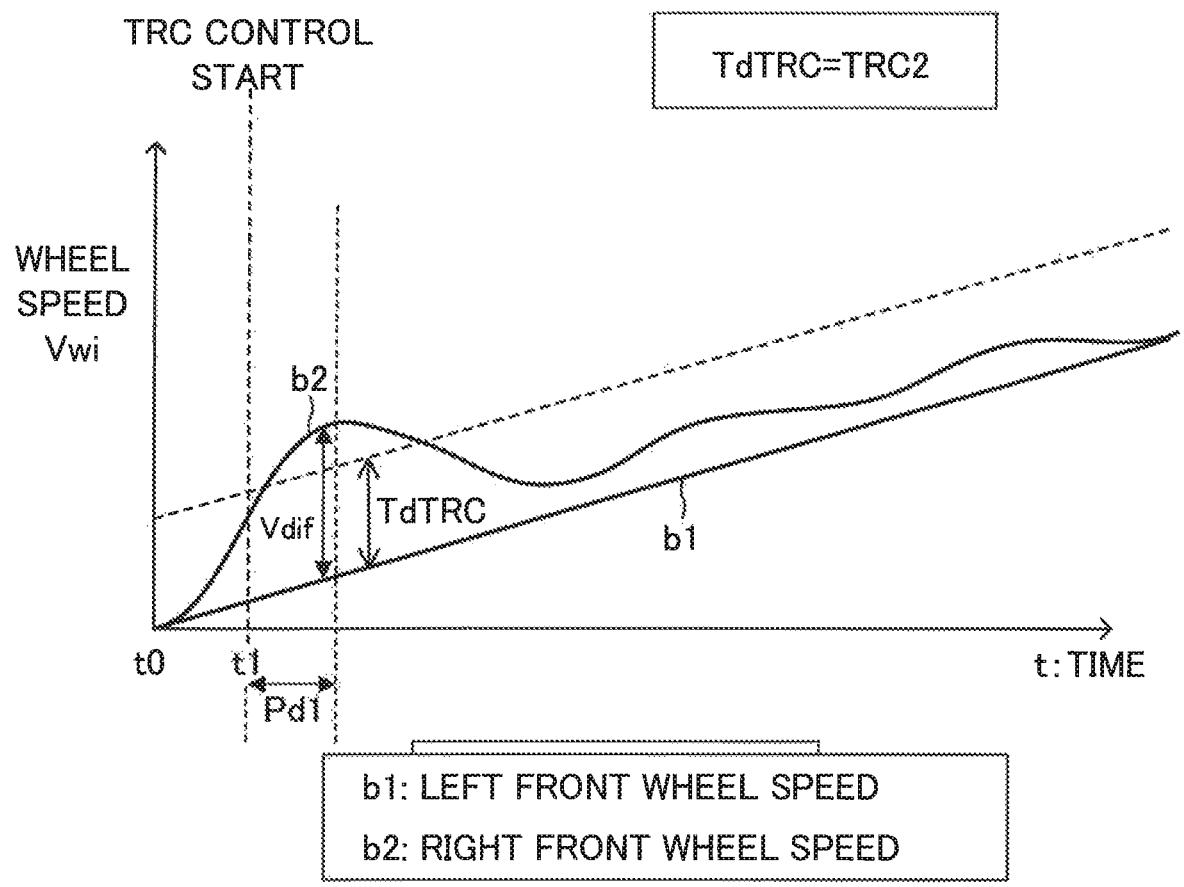
FIG. 14 is a graph showing change of the wheel speed of the left drive wheel and change of the wheel speed of the right drive wheel when the TRC control is performed for the vehicle traveling on the right low μ split road.

That is, when the vehicle SV traveling on the right low μ split road is accelerated and the TRC control for the right front wheel WFR is started, the absolute value |Vdif| of the wheel speed difference Vdif becomes larger within the predetermined period Pd1 as shown by a line b1 and a line b2 in FIG. 14. If this happens, an unnecessary yaw moment in the right turning direction, which degrades/reduces the stability of the behavior of the vehicle SV, is generated in the vehicle SV due to the driving force difference between the left and right drive wheels. As a result, there is a probability that the behavior of the vehicle SV while it is being accelerated becomes unstable.

In view of the above, when the absolute value |Vdif| of the wheel speed difference Vdif becomes larger than the split determination threshold TdTRC within the predetermined period Pd1 and the right front wheel speed VwFR is larger than the left front wheel speed VwFL, the brake ECU 40 determines that the traveling road of the vehicle SV is the right low μ split road. In this case, the brake ECU 40 performs the TRC sprit control to adjust the braking force applied to a predetermined wheel Wi (e.g., the right front wheel WFR) so as to decrease/reduce the unnecessary yaw moment in the right turning direction. For example, the brake ECU 40 increases the braking force applied to the right front wheel WFR.

<Outline of Operation>

The vehicle control ECU 10 of the second control apparatus determines the road surface μ state based on the front image obtained from the camera 11 in the same manner as the first control apparatus does. The vehicle control ECU 10 determines the road surface μ state of the forward road, and thereafter, sets the split determination threshold TdTRC to a value corresponding to that determined result.

More specifically, when the forward road of the vehicle SV is determined to be the left and right uniform μ road based on the front image, the vehicle control ECU 10 sets the split determination threshold TdTRC to a first TRC threshold (=TRC1). When the forward road of the vehicle SV is determined to be the split μ road based on the front image, the vehicle control ECU 10 sets the split determination threshold TdTRC to a second TRC threshold (=TRC2). When the forward road is determined to be the undecidable road based on the front image, the vehicle control ECU 10 sets the split determination threshold TdTRC to a third TRC threshold. It should be noted that each of TRC1, TRC2, and TRC3 is a positive value.

The first to third TRC thresholds have been determined so as to satisfy the following relational expression (4).

$$TRC1 > TRC3 > TRC2 \quad (4)$$

The reason why the first to third TRC thresholds are set in such a manner that the relational expression (4) holds is substantially the same as the reason why the first to third ABS thresholds are set in such a manner that the relational expression (2) holds.

That is, when it is determined that the forward road of the vehicle SV is the left and right uniform μ road based on the front image, by setting the split determination threshold TdTRC to a relatively large value, a possibility that the forward road is determined to be the split μ road using the absolute value |Vdif| of the wheel speed difference Vdif becomes lower. Accordingly, it is possible to prevent the TRC split control from being performed inappropriately when the traveling road of the vehicle SV is actually the left and right uniform μ road.

When it is determined that the forward road of the vehicle SV is the split μ road based on the front image, by setting the split determination threshold TdTRC to a relatively small value, the absolute value |Vdif| of the wheel speed difference Vdif becomes larger than the split determination threshold TdTRC at a time point before the absolute value |Vdif| of the wheel speed difference Vdif becomes considerably large. Therefore, when there is a high possibility that the traveling road of the vehicle SV is the split μ road is made high. Accordingly, when the traveling road of the vehicle SV is actually the split μ road, the TRC split control can be surely performed in an appropriate period.

When it is determined that the forward road of the vehicle SV is the undecidable road based on the front image, the TRC split control for the right low μ split road may be performed if the split determination threshold TdTRC is excessively small, although the vehicle traveling road of the vehicle SV is actually the left low μ split road. Similarly, the TRC split control for the left low μ split road may be performed if the split determination threshold TdTRC is excessively small, although the vehicle traveling road of the vehicle SV is actually the right low μ split road. In contrast, in this case, the TRC split control is hard to be performed, if the split determination threshold TdTRC is excessively large.

As understood from the above, when it is determined that the forward road of the vehicle SV is the undecidable road based on the front image, the split determination threshold Td TRC is set to the third TRC threshold (=TRC3) having an intermediate magnitude (a magnitude between the first TRC threshold and the second TRC threshold).

<Specific Operation>

Figure 15:
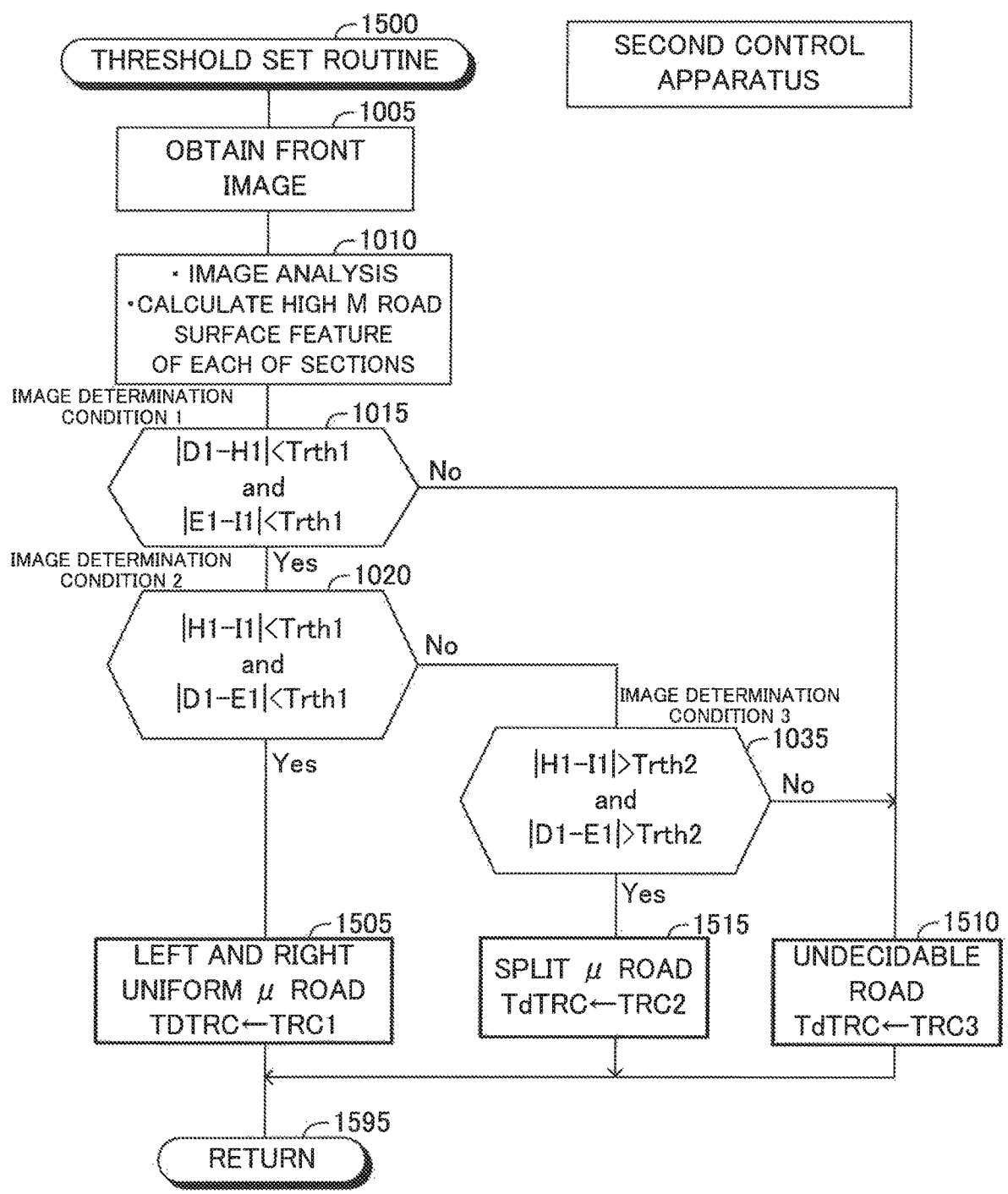
FIG. 15 is a flowchart showing a routine executed by a CPU of a vehicle control ECU of a second control apparatus.

The CPU executes a routine shown by a flowchart in FIG. 15, every time a predetermined time elapses. It should be noted that the steps shown in FIG. 15 which cause the CPU to execute the same processes as those of the steps of the routing shown in FIG. 10 are given the same reference numerals as the reference numerals given to those steps shown in FIG. 10. The descriptions on the processes of those steps are omitted as appropriate (the same applies hereinafter).

When both of the image determination condition 1 and the image determination condition 2 are satisfied, the CPU proceeds to step 1505 to determine that the forward road is the left and right uniform μ road, and sets the value of the split determination threshold TdTRC to the first TRC threshold TRC1 (=TRC1). Thereafter, the CPU proceeds to step 1595 to tentatively terminate the present routine.

When the image determination condition 1 is not satisfied, or when the image determination condition 1 is satisfied but neither the image determination condition 2 nor the image determination condition 3 is satisfied, the CPU proceeds to step 1505 and determines that the forward road is the undecidable road, and sets the value of the split determination threshold TdTRC to the third TRC threshold TRC (=TRC3). Thereafter, the CPU proceeds to step 1595 to tentatively terminate the present routine.

When both of the image determination condition 1 and the image determination condition 3 are satisfied, the CPU proceeds to step 1515 and determines that the forward road is the split μ road to set the value of the split determination threshold TdTRC to the second TRC threshold TRC2 (=TRC2). Thereafter, the CPU proceeds to step 1595 to tentatively terminate the present routine.

Figure 16:
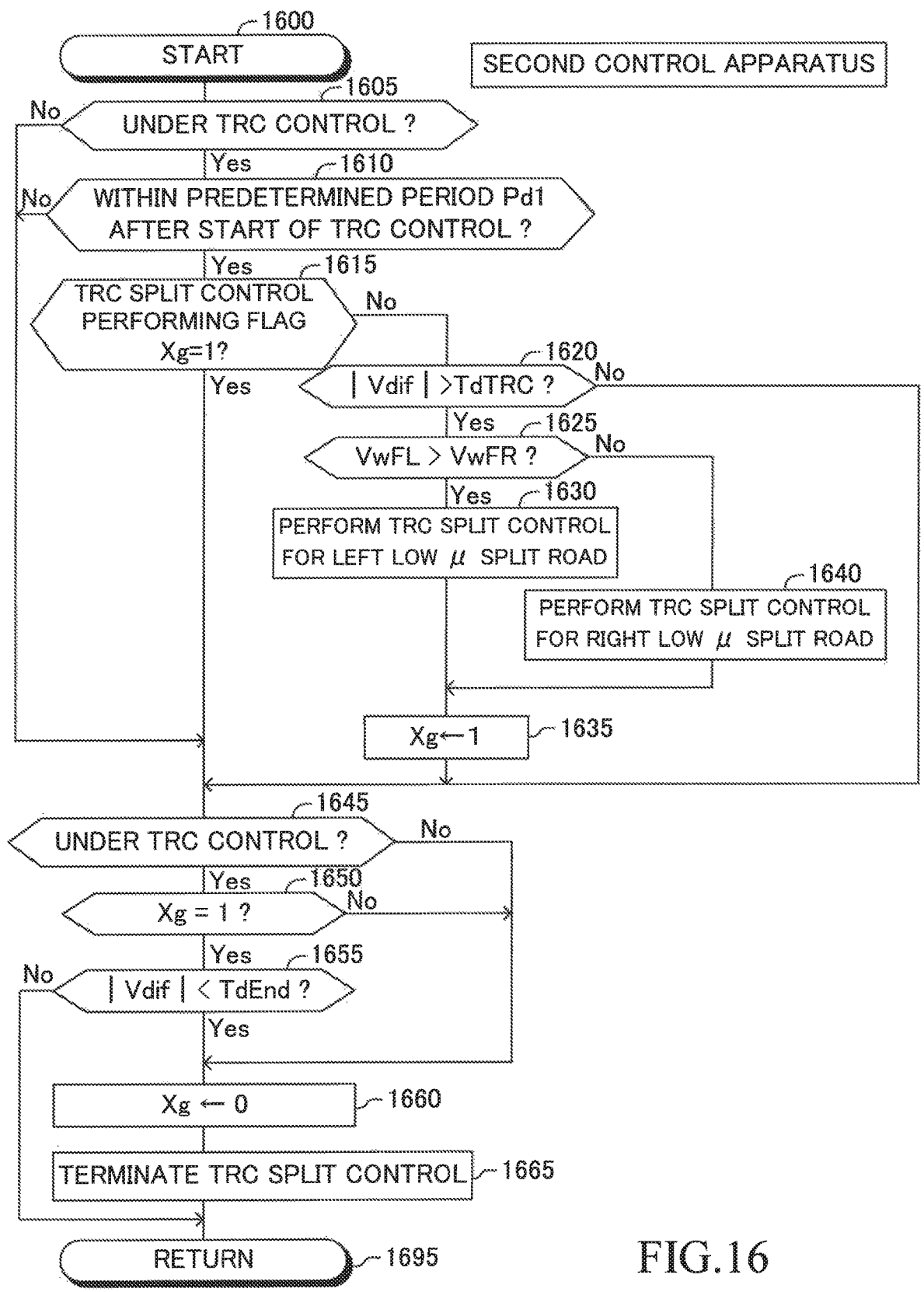
FIG. 16 is a flowchart showing a routine executed by the CPU of the vehicle control ECU of the second control apparatus.

Furthermore, the CPU executes a routine shown by a flowchart in FIG. 16, every time a predetermined time elapses.

Therefore, when an appropriate timing arrives, the CPU starts processing from step 1600 of FIG. 16 and proceeds to step 1605 to determine whether or not the TRC control is being performed for at least any one of the left front wheel WFL and the right front wheel WFR. In other words, the CPU determines whether or not the current time point is within a period from a time point at which the TRC start condition becomes satisfied to a time point at which the TRC termination condition becomes satisfied. It should be noted that the period from the time point at which the TRC start condition becomes satisfied to the time point at which the TRC termination condition becomes satisfied may be referred to as a "TRC performing condition satisfied period" in some cases.

When the TRC control is being not performed, the CPU makes a "No" determination at step 1605 to proceed to step 1645.

In contrast, when the TRC control is being performed, the CPU makes a "Yes" determination at step 1605 and proceeds to step 1610 to determine whether or not the current time point is within the predetermined period Pd1 which starts from the start time point of the TRC control. When the current time point is not within the predetermined period Pd1, the CPU makes a "No" determination at step 1610 to proceed to step 1645.

When the current time point is within the predetermined period Pd1, the CPU makes a "Yes" determination at step 1610 and proceeds to step 1615 to determine whether or not a value of a TRC split control performing flag Xg is "1".

The flag Xg indicates that the TRC split control is being performed when the value of the flag Xg is "1". That is, the flag Xg indicates that any one of the TRC split control for the left low μ split road and the TRC split control for the right low μ split road is being performed when the value of the flag Xg is "1". The the value of the flag Xg is set to "0" in the above-described initialization routine. Furthermore, the the value of the flag Xg is also set to "0" when the TRC control is terminated (refer to step 1660 described below). The the value of the flag Xg is set to "1" at step 1635 described below.

When the value of the flag Xg is "1", the CPU makes a "Yes" determination at step 1615 to proceed to step 1645. In contrast, when the value of the flag Xg is not "1" (that is, when the value of the flag Xg is "0"), the CPU proceeds to step 1620 to determine whether or not the absolute value |Vdif| of the wheel speed difference Vdif is larger than the split determination threshold TdTRC. That split determination threshold TdTRC has been set to any one of the first TRC threshold (=TRC1), the second TRC threshold (=TRC2), and the third TRC threshold (=TRC3), throguh the routine of FIG. 15 described above.

When the absolute value |Vdif| of the wheel speed difference Vdif (=VwFR−VwFL) is larger than the split determination threshold TdTRC, the CPU makes a "Yes" determination at step 1620 and proceeds to step 1625 to determine whether or not the left front wheel speed VwFL is larger than the right front wheel speed VwFR.

When the left front wheel speed VwFL is larger than the right front wheel speed VwFR, the CPU makes a "Yes" determination at step 1625 and proceeds to step 1630 to perform the above-described TRC split control for the left low μ split road. Thereafter, the CPU proceeds to step 1635 to set the value of the flag Xg to "1", and proceeds to step 1645.

In contrast, when the left front wheel speed VwFL is not larger than the left front wheel speed VwFR (that is, when the right front wheel speed VwFR is larger than the left front wheel speed VwFL), the CPU makes a "No" determination at step 1625 and proceeds to step 1640 to perform the above-described TRC split control for the right low μ split road. Thereafter, the CPU proceeds to step 1635 to set the value of the flag Xg to "1", and proceeds to step 1645.

Furthermore, at step 1620, when the absolute value |Vdif| of the wheel speed difference Vdif is not larger than the split determination threshold TdTRC, the CPU makes a "No" determination at step 1620 to proceed to step 1645.

In this manner, when the absolute value |Vdif| of the wheel speed difference Vdif becomes larger than the split determination threshold TdTRC within the predetermined period Pd1 which starts the time point at the TRC control is started, the TRC split control (that is, any one of the TRC split control for the left low μ split road and the TRC split control for the right low μ split road) starts to be performed.

Furthermore, at step 1645, the CPU determines again whether or not the TRC control is being performed for at least any one of the left front wheel WFL and the right front wheel WFR. When the TRC control is being performed, the CPU makes a "Yes" determination at step 1645 and proceeds to step 1650 to determine whether or not the value of the flag Xg is "1".

When the value of the flag Xg is "1", the CPU makes a "Yes" determination at step 1650 and proceeds to step 1655 to determine whether or not the absolute value |Vdif| of the wheel speed difference Vdif is smaller than the determination termination threshold TdEnd. That determination termination threshold TdEnd has been set to a value which is a positive value and is smaller than any split determination threshold TdTRC (that is, is smaller than TRC3).

When the absolute value |Vdif| of the wheel speed difference Vdif is not smaller than the determination termination threshold TdEnd, the CPU makes a "No" determination at step 1655 and directly proceeds to step 1695 to tentatively terminate the present routine.

In contrast, the absolute value |Vdif| of the wheel speed difference Vdif is smaller than the determination termination threshold TdEnd, the CPU makes a "Yes" determination at step 1655 and sequentially executes the processes of steps 1660 and 1665 described below. Thereafter, the CPU proceeds to step 1695 to tentatively terminate the present routine.

Step 1660: the CPU sets the value of the flag Xg to "0".
Step 1665: the CPU terminates the TRC split control which is being performed at the current time point.

It should be noted that when the CPU makes a "No" determination at step 1645, the CPU executes the processes of step 1660 and step 1665 and thereafter, proceeds to step 1695. Similarly, the CPU makes a "No" determination at step 1650, the CPU executes the processes of step 1660 and step 1665, and thereafter, proceeds to step 1695.

As mentioned above, the second control apparatus determines/specifies what/which the forward road is based on the front image, the left and right uniform μ road, the split μ road, or the undecidable road. The second control apparatus sets the split determination threshold TdTRC based on the determined/specified result. Therefore, according to the second control apparatus, it is possible to prevent the TRC split control from being performed inappropriately when the vehicle SV is traveling on the left and right uniform μ road. Furthermore, according to the second control apparatus, when the vehicle SV is traveling on the split μ road, the TRC split control can be surely performed appropriately (at an early appropriate timing).

Third Embodiment

The vehicle control apparatus (hereinafter, referred to a "third control apparatus" in some cases) according to the third embodiment of the present invention differs from the first control apparatus only in the following points.

The third control apparatus is configured to perform an ABS steering assist control described later in place of the ABS split control.

The third control apparatus is configured to determine the road surface µ state of the forward road based on the front image, and thereafter, sets the split determination threshold TdEPS to any one of values different from each other in accordance with that determined result.

It should be noted that the split determination threshold TdEPS is used to determine whether whether or not the ABS steering assist control is performed.

The third control apparatus is configured to change a magnitude of a control amount (the steering assist torque) used in the ABS steering assist control in accordance with the above-described determined result.

The different points of the third control apparatus from the first control apparatus will next be mainly described. It should be noted that the third control apparatus may or may not be configured to perform "the TRC control and the TRC split control" which the second control apparatus performs.

The vehicle control ECU 10 is configured to perform the "ABS steering assist control" using the EPS ECU 30. The ABS steering assist control is performed when the wheel speed difference Vdif (=VwFR−VwFL) between the front left wheel speed and the right wheel speed satisfies a predetermined condition within the predetermined period Pd1 which starts from the start time point of the ABS control for any one of the left front wheel WFL and the right wheel WFR. The ABS steering assist control is a type of the above-described vehicle behavior stabilization control.

Figure 17:
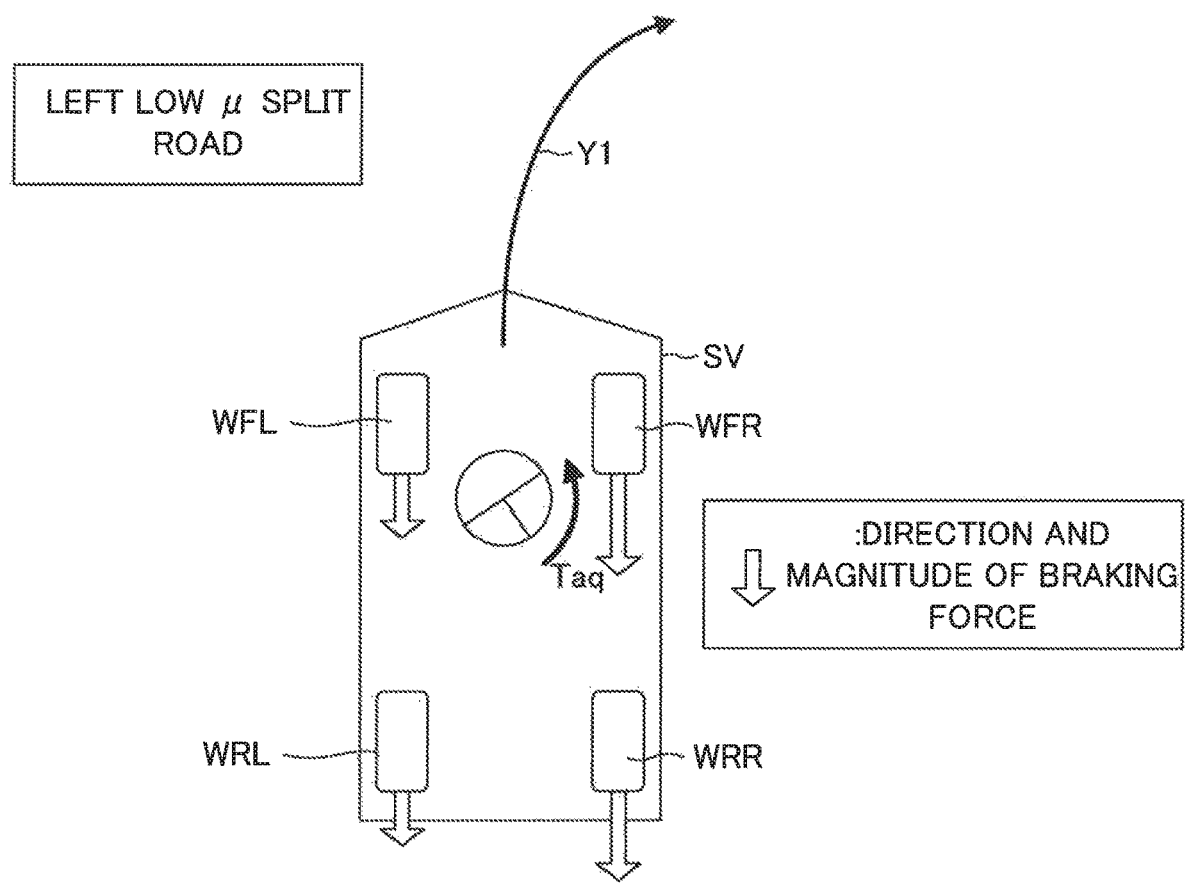
FIG. 17 is a schematic plan view showing behavior of the vehicle when the ABS control is being performed for the vehicle traveling on the left low μ split road.

As shown in FIG. 17, consider a situation where the ABS control is performed when the vehicle SV traveling on the left low µ split road has been braked.

In this case, as described above, the unnecessary yaw moment (refer to an arrow Y1) in the right turning direction, which reduces the stability of the behavior of the vehicle SV, is generated in the vehicle SV due to the braking force difference between the left and right wheels.

In view of the above, when the absolute value |Vdif| of the wheel speed difference Vdif becomes larger than the split determination threshold TdEPS within the predetermined period Pd1 and the left front wheel speed VwFL is smaller than the right front wheel speed VwFR, the brake ECU 40 determines that the traveling road of the vehicle SV is the left low µ split road.

In this case, the vehicle control ECU 10 applies the steering assist torque Taq to the steering mechanism so as to decrease/reduce the unnecessary yaw moment in the right turning direction. In other words, the vehicle control ECU 10 changes an actual steering angle to a steering angle for causing the yaw moment in the left turning direction. This steering control is the ABS steering assist control. Thereby, the behavior of the vehicle SV can be stabilized.

Figure 18:
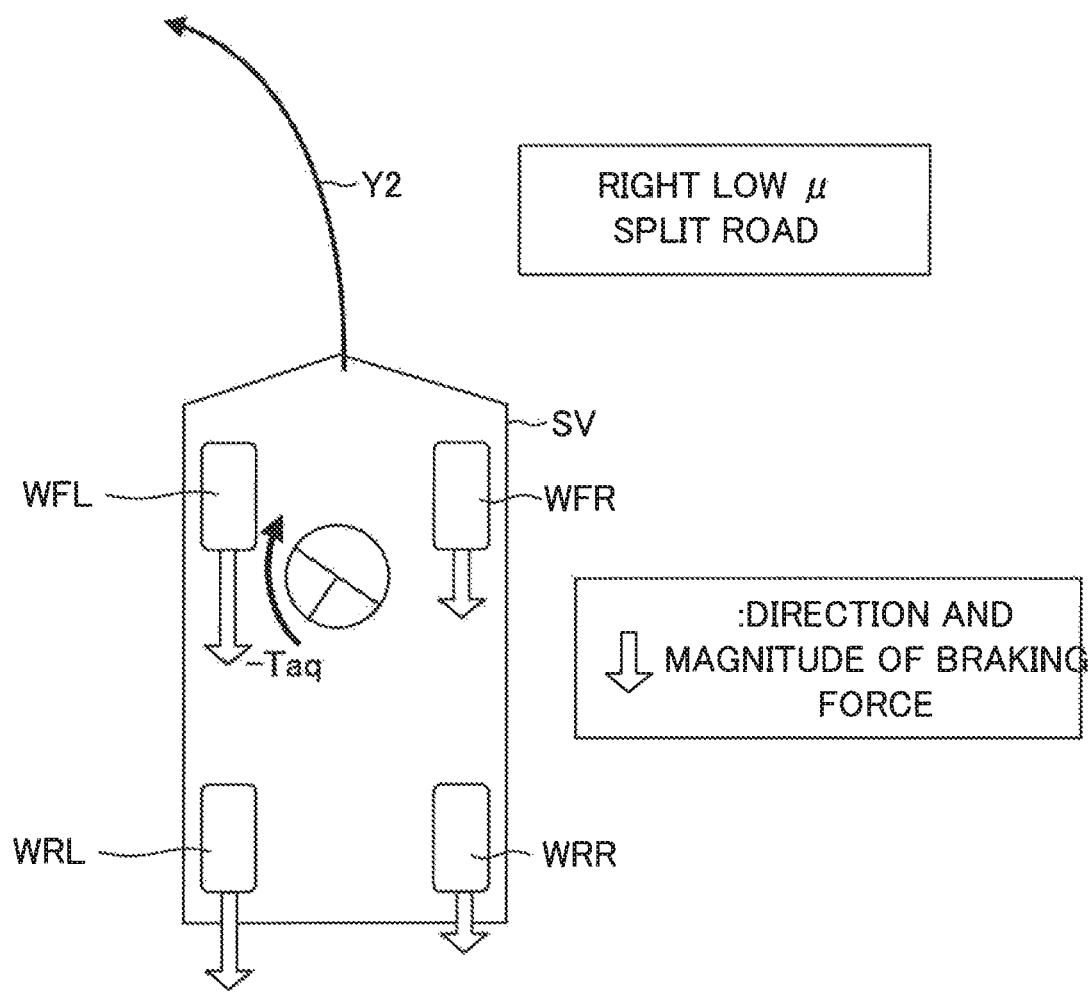
FIG. 18 is a schematic plan view showing behavior of the vehicle when the ABS control is being performed for the vehicle traveling on the right low μ split road.

In contrast, as shown in FIG. 18, consider a situation where the ABS control is performed when the vehicle SV traveling on the right low µ split road has been braked.

In this case, as described above, the unnecessary yaw moment (refer to an arrow Y2) in the left turning direction, which reduces the stability of the behavior of the vehicle SV, is generated in the vehicle SV due to the braking force difference between the left and right wheels.

In view of the above, when the absolute value |Vdif| of the wheel speed difference Vdif becomes larger than the split determination threshold TdEPS within the predetermined period Pd1 and the right front wheel speed VwFR is smaller than the left front wheel speed VwFL, the brake ECU 40 determines that the traveling road of the vehicle SV is the right low µ split road.

In this case, the vehicle control ECU 10 applies the steering assist torque Taq to the steering mechanism so as to decrease/reduce the unnecessary yaw moment in the left turning direction. In other words, the vehicle control ECU 10 changes an actual steering angle to a steering angle for causing the yaw moment in the right turning direction. This steering control is also the ABS steering assist control. Thereby, the behavior of the vehicle SV can be stabilized.

<Outline of Operation>

The vehicle control ECU 10 of the third control apparatus determines the road surface µ state based on the front image obtained from camera 11 in the same manner as the first control apparatus does. The vehicle control ECU 10 determines the road surface µ state of the forward road, and thereafter, sets the split determination threshold TdEPS to a value corresponding to that determined result. In addition, the vehicle control ECU 10 changes the steering assist torque Taq of the ABS steering assist control in accordance with that determined result.

More specifically, when the forward road of the vehicle SV is determined to be the left and right uniform µ road based on the front image, the vehicle control ECU 10 sets the split determination threshold TdEPS to a first EPS threshold (=EPS1) and sets the steering assist torque Taq to a first torque value (=Taq1). When the forward road of the vehicle SV is determined to be the split µ road based on the front image, the vehicle control ECU 10 sets the split determination threshold TdEPS to a second EPS threshold (=EPS2) and sets the steering assist torque to a second torque value (=Taq2). When the forward road is determined to be the undecidable road based on the front image, the vehicle control ECU 10 sets the split determination threshold TdEPS to a third EPC threshold and sets the steering assist torque Taq to a third torque value (=Taq3). It should be noted that each of EPS1, EPS2, and EPS3 is a positive value, and each of Taq1, Taq2, and Taq3 is a positive value.

The first to third EPS thresholds have been determined so as to satisfy the following relational expression (5). The first to third torque values have been determined so as to satisfy the following relational expression (6).

$$EPS1 > EPS3 > EPS2 \quad (5)$$

$$Taq2 > Taq3 > Taq1 \quad (6)$$

The reason why the first to third EPS thresholds are set in such a manner the relational expression (5) holds is substantially the same as the reason why the first to third ABS thresholds are set in such a manner the relational expression (2) holds.

The reason why the first to third torque values are set in such a manner the relational expression (6) holds is as follows.

When it is determined that the forward road of the vehicle SV is the left and right uniform µ road based on the front image, the split determination threshold TdEPS is set to EPS1. Therefore, if the traveling road of the vehicle SV is actually the left and right uniform µ road, the traveling road of the vehicle SV is hard to be incorrectly determined to be the split µ road.

However, if the traveling road of the vehicle SV is incorrectly determined to be the split µ road when the traveling road of the vehicle SV is actually the left and right uniform µ road, the ABS steering assist control is performed. In this case, if the magnitude |Taq| of the steering assist torque Taq (Taq or −Taq) has been set to a relatively small magnitude, the stability of the behavior of the vehicle SV is less likely to be degraded/reduced due to the ABS steering assist control. Therefore, when it is determined that the forward road of the vehicle SV is the left and right uniform μ road based on the front image, the magnitude |Taq| of the steering assist torque Taq is set to the first torque value (=Taq1) having a relatively small value.

When it is determined that the forward road of the vehicle SV is the split μ road based on the front image, the split determination threshold TdEPS is set to TRC2. Therefore, when a possibility that the traveling road of the vehicle SV is the split μ road is high, a possibility that the traveling road of the vehicle SV is properly determined to be the split μ road is made high. Accordingly, when the traveling road of the vehicle SV is actually the split μ road, the ABS steering assist control can be surely performed in an appropriate period.

In this case, if the magnitude |Taq| of the steering assist torque Taq has been set to a relatively large magnitude, there is a probability that the stability of the behavior of the vehicle SV is increased/enhanced by the appropriate ABS steering assist control. Therefore, when it is determined that the forward road of the vehicle SV is the split μ road based on the front image, the magnitude |Taq| of the steering assist torque Taq is set to the second torque value (=Taq2) having a relatively large value.

When it is determined that the forward road of the vehicle SV is the undecidable road based on the front image, suppose the ABS steering control is started. In this case, if the magnitude |Taq| of the steering assist torque Taq is excessively large or excessively small, there is a high possibility that the stability of the behavior of the vehicle SV is rather degraded/reduced. Therefore, in this case, the magnitude |Taq| of the steering assist torque Taq is set to the third torque value (=Taq3) having an intermediate magnitude (a magnitude between the first torque value and the second torque value).

<Specific Operation>

Figure 19:
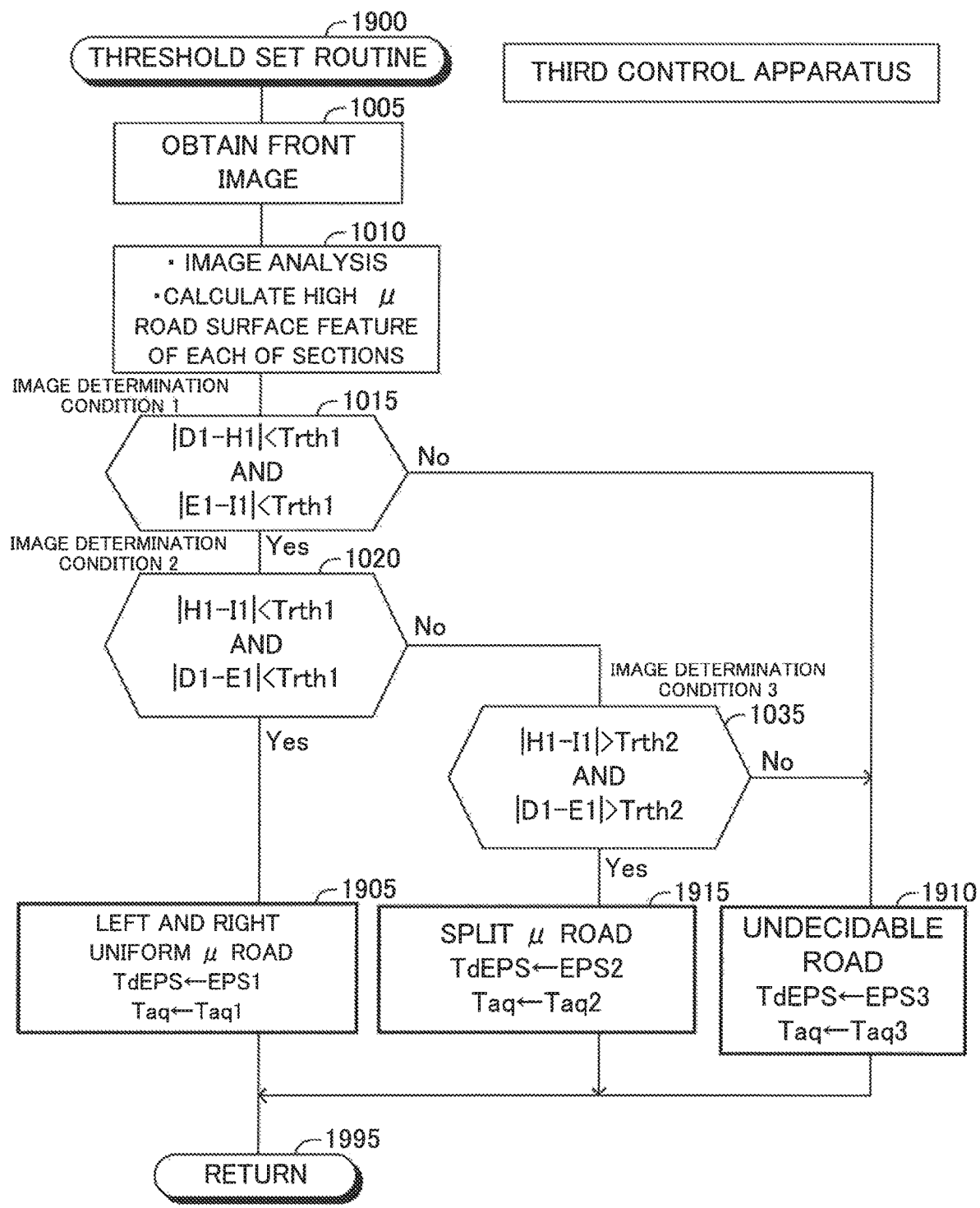
FIG. 19 is a flowchart showing a routine executed by a CPU of a vehicle control ECU of a third control apparatus.

The CPU executes a routine shown by a flowchart in FIG. 19, every time a predetermined time elapses. It should be noted that the steps shown in FIG. 19 which cause the CPU to execute the same processes as the steps of the routing shown in FIG. 10 are given the same reference numerals as the reference numerals given to those steps shown in FIG. 10.

When both of the image determination condition 1 and the image determination condition 2 are satisfied, the CPU proceeds to step 1905 to determine that the forward road is the left and right uniform μ road, and sets the value of the split determination threshold TdEPS to the first EPS threshold EPS1 (=EPS1). In addition, the CPU sets the value of the steering assist torque Taq to the first torque value Taq1. Thereafter, the CPU proceeds to step 1995 to tentatively terminate the present routine.

When the image determination condition 1 is not satisfied, or when the image determination condition 1 is satisfied but neither the image determination condition 2 nor the image determination condition 3 is satisfied, the CPU proceeds to step 1910 to determine that the forward road is the undecidable road, and sets the value of the split determination threshold TdEPS to the third EPS threshold EPS3 (=EPS3). In addition, the CPU sets the value of the steering assist torque Taq to the third torque value Taq3. Thereafter, the CPU proceeds to 1995 to tentatively terminate the present routine.

When both of the image determination condition 1 and the image determination condition 3 are satisfied, the CPU proceeds to step 1915 to determine that the forward road is the split μ road, and sets the value of the split determination threshold TdEPS to the second EPS threshold EPS2 (=EPS2). In addition, the CPU sets the value of the steering assist torque Taq to the second torque value Taq2. Thereafter, the CPU proceeds to 1995 to tentatively terminate the present routine.

Figure 20:
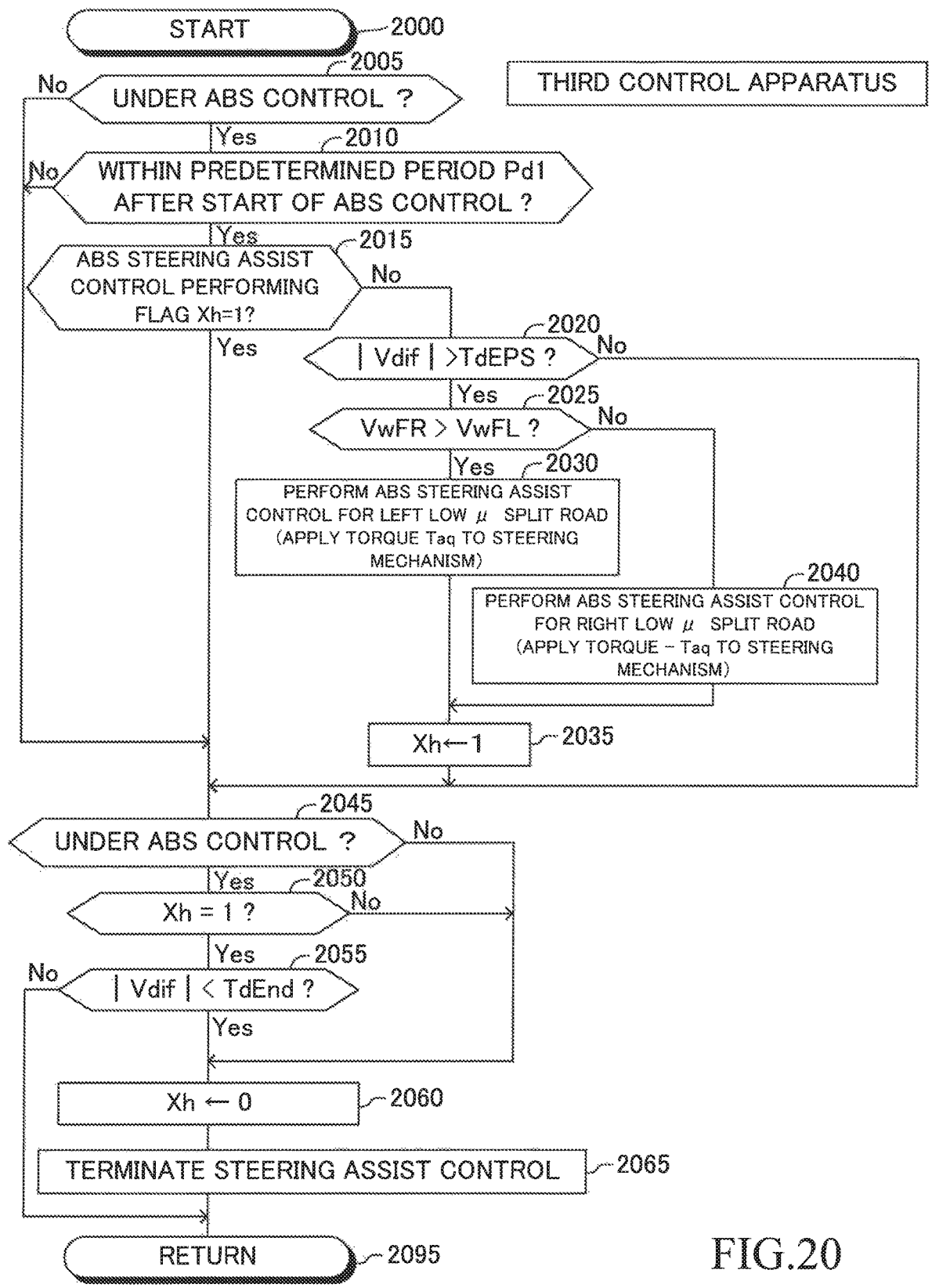
FIG. 20 is a flowchart showing a routine executed by the CPU of the vehicle control ECU of the third control apparatus.

Furthermore, the CPU executes a routine shown by a flowchart in FIG. 20, every time a predetermined time elapses.

Therefore, when an appropriate timing arrives, the CPU starts processing from step 2000 of FIG. 20 and proceeds to step 2005 to determine whether or not the ABS control is being performed for at least any one of the left front wheel WFL and the right front wheel WFR. In other words, the CPU determines whether or not the current time point is within a period from a time point at which the ABS start condition becomes satisfied to a time point at which the ABS termination condition becomes satisfied. It should be noted that the period from the time point at which the ABS start condition becomes satisfied to the time point at which the ABS termination condition becomes satisfied may be referred to as an "ABS performing condition satisfied period" in some cases.

When the ABS control is not being performed, the CPU makes a "No" determination at step 2005 to proceed to step 2045.

In contrast, when the ABS control is being performed, the CPU makes a "Yes" determination at step 2005 and proceeds to step 2010 to determine whether or not the current time point is within the predetermined period Pd1 which starts from the start of ABS control. When the current time point is not within the predetermined period Pd1, the CPU makes a "No" determination at step 2010 to proceed to step 2045.

When the current time point is within the predetermined period Pd1, the CPU makes a "Yes" determination at step 2010 and proceeds to step 2015 to determine whether or not a value of an ABS steering assist control flag Xh is "1".

The flag Xh indicates that the ABS steering assist control is being performed when the value of the flag Xh is "1". That is, the flag Xh indicates that any one of the ABS steering assist control for the left low μ split road and the ABS steering assist control for the right low μ split road is being performed when the value of the flag Xh is "1". The flag Xh is set to "0" in the above-described initialization routine. Furthermore, the flag Xh is also set to "0" when the ABS control is terminated (refer to step 2060 described below). The flag Xh is set to "1" at step 2035 described later.

When the value of the flag Xh is "1", the CPU makes a "Yes" determination at step 2015 to proceed to step 2045. In contrast, when the value of the flag Xh is not "1" (that is, when the value of the flag Xh is "0"), the CPU proceeds to step 2020 to determine whether or not the absolute value |Vdif| of the wheel speed difference Vdif is larger than the split determination threshold TdEPS. That split determination threshold TdEPS has been set to any one of the first EPS threshold (=EPS1), the second EPS threshold (=EPS2), and the third EPS threshold (=EPS3) through the routine of FIG. 19 described above.

When the absolute value |Vdif| of the wheel speed difference Vdif (=VwFR−VwFL) is larger than the split determination threshold TdEPS, the CPU makes a "Yes" determination at step 2020 and proceeds to step 2025 to determine whether or not the right front wheel speed VwFR is larger than the left front wheel speed VwFL.

When the right front wheel speed VwFR is larger than the left front wheel speed VwFL, the CPU makes a "Yes" determination at step 2025 and proceeds to step 2030 to perform the above-described ABS steering assist control for the left low μ split road. That is, the CPU applies "the steering assist torque Taq for causing the yaw moment in the left turning direction to act on the vehicle SV" to the steering mechanism using the EPS ECU 30. Thereafter, the CPU proceeds to step 2035 to set the value of the flag Xh to "1", and proceeds to step 2045. The magnitude of that steering assist torque Taq has been set to any one of the first torque value (=Taq1), the second torque value (=Taq2), and the third torque value (=Taq3) through the above-described routine shown in FIG. 19.

In contrast, when the left front wheel speed VwFR is not larger than the left front wheel speed VwFL (that is, when the left front wheel speed VwFL is larger than the right front wheel speed VwFR), the CPU makes a "No" determination at step 2025 and proceeds to step 2040 to perform the above-described ABS steering assist control for the right low μ split road. That is, the CPU applies "the steering assist torque—Taq for causing the yaw moment in the right turning direction to act on the vehicle SV" to the steering mechanism using the EPS ECU 30. Thereafter, the CPU proceeds to step 2035 to set the value of the flag Xh to "1", and proceeds to step 2045.

Furthermore, at step 2020, when the absolute value |Vdif| of the wheel speed difference Vdif is not larger than the split determination threshold TdEPS, the CPU makes a "No" determination at step 2020 to proceed to step 2045.

In this manner, when the absolute value |Vdif| of the wheel speed difference Vdif is larger than the split determination threshold TdEPS within the predetermined period Pd1 which starts from the start time point of the ABS control, the ABS steering assist control (that is, any one of the ABS steering assist control for the left low μ split road and the ABS steering assist control for the right low μ split road) starts to be performed.

Furthermore, at step 2045, the CPU determines again whether or not the ABS control is being performed for at least any one of the left front wheel WFL and the right front wheel WFR. When the ABS control is being performed, the CPU makes a "Yes" determination at step 2045 and proceeds to step 2050 to determine whether or not the value of the flag Xh is "1".

When the value of the flag Xh is "1", the CPU makes a "Yes" determination at step 2050 and proceeds to step 2055 to determine whether or not the absolute value |Vdif| of the wheel speed difference Vdif is smaller than the determination termination threshold TdEnd. That determination termination threshold TdEnd has been set to a value which is a positive value and is smaller than any split determination threshold TdEPS (that is, is smaller than EPS3).

When the absolute value |Vdif| of the wheel speed difference Vdif is not smaller than the determination termination threshold TdEnd, the CPU makes a "No" determination at step 2055 and directly proceeds to step 2095 to tentatively terminate the present routine.

In contrast, the absolute value |Vdif| of the wheel speed difference Vdif is smaller than the determination termination threshold TdEnd, the CPU makes a "Yes" determination at step 2055 and sequentially executes the processes of steps 2060 and 2065 described below. Thereafter, the CPU proceeds to step 2095 to tentatively terminate the present routine.

Step 2060: the CPU sets the value of the flag Xh to "0".

Step 2065: the CPU terminates the ABS steering assist control which is being performed at the current time point.

It should be noted that when the CPU makes a "No" determination at step 2045, the CPU executes the processes of step 2060 and step 2065 and thereafter, proceeds to step 2095. Similarly, when the CPU makes a "No" determination at step 2050, the CPU executes the processes of step 2060 and step 2065 and thereafter, proceeds to step 2095.

As described above, the third control apparatus determines/specifies what/which the forward road is based on the front image, the left and right uniform μ road, the split μ road, or the undecidable road, and sets the split determination threshold TdEPS based on the determined/specified result. Therefore, according to the third control apparatus, it is possible to prevent the ABS steering assist control from being performed inappropriately when the vehicle SV is traveling on the left and right uniform μ road. Furthermore, according to the third control apparatus, when the vehicle SV is traveling on the split μ road, the ABS steering assist control can surely performed appropriately (at an early appropriate timing).

Furthermore, according to the third control apparatus, a magnitude of the steering assist torque in the ABS steering assist control is set to an appropriate magnitude in accordance with the above-described result determined/specified on based the front image. Thereby, the steering assist torque having the appropriate magnitude is applied to the steering mechanism in accordance with the state of the road surface μ of the traveling road of the vehicle SV. Consequently, it is possible to reduce the possibility that the behavior of the vehicle SV becomes unstable.

Although each of the embodiments of the present invention has been specifically described, the present invention is not limited to the above-described embodiments, and various modifications based on the technical idea of the present invention are possible. For example, the third control apparatus may be configured to perform the TRC steering assist control which is similar to and corresponds to the ABS steering assist control when the third control apparatus is performing the traction control.

What is claimed is:

1. A vehicle control apparatus applied to a vehicle, said vehicle comprising:
   an imaging device configured to be capable of obtaining a front image by photographing a view in front of said vehicle;
   wheel speed sensors configured to obtain a signal relating to a wheel speed of each of a plurality of wheels provided to said vehicle;
   a brake device configured to be capable of controlling a braking force applied to each of said wheels;
   a drive device configured to be capable of controlling a driving force applied to drive wheels among said wheels; and
   a steering device configured to be capable of changing a steering angle of steered wheels among said wheels, wherein
   said vehicle control apparatus comprises a vehicle control unit configured to:
     perform a wheel slip control including at least any one of:
       an antilock brake control performed using said brake device within an ABS condition satisfied period; and
       a traction control performed using said drive device within an TRC condition satisfied period; and perform vehicle behavior stabilization control to apply to said vehicle a yaw moment for stabilizing a behavior of said vehicle using any one of said brake device, said drive device, and said steering device, when a magnitude of a wheel speed difference becomes larger than a threshold within a predetermined period;

the predetermined period starts from a time point at which said wheel slip control or said vehicle behavior stabilization control is started;

in a case where said wheel slip control is being performed, said wheel speed difference being a difference between:
- a first wheel speed of a first wheel which is any one of said wheels which is being controlled by said wheel slip control; and
- a second wheel speed of a second wheel which is any one of said wheels other than said first wheel and is symmetrically positioned about a center line of said vehicle with respect to said first wheel, and said vehicle control unit is further configured to:
- determine, based on said front image, whether forward road of said vehicle is a left and right uniform μ road to be considered as a road which does not have a left and right road surface μ difference, said left and right road surface μ difference being a magnitude of a difference between a left side friction coefficient of a road surface on which one or more of said wheels on a left side of said vehicle is grounded and a right side friction coefficient of a road surface on which one or more of said wheels on a right side of said vehicle is grounded;
- determine, based on said front image, whether or not said forward road of said vehicle is a split μ road to be considered as a road which has said left and right road surface μ difference;
- set said threshold to a first threshold, when it is determined, based on said front image, that said forward road is said left and right uniform μ road; and
- set said threshold to a second threshold smaller than said first threshold, when it is determined, based on said front image, that said forward road is said split μ road.

2. The vehicle control apparatus according to claim 1, wherein,
said vehicle control unit is configured to set said threshold to a third threshold which is smaller than said first threshold and is larger than said second threshold, when it is determined, based on said front image, that said forward road is not said left and right uniform μ road, and it is determined, based on said front image, that said forward road is not said split μ road.

3. The vehicle control apparatus according to claim 1, wherein,
said vehicle control unit is configured to perform, as said vehicle behavior stabilization control, a steering assist control to change a steering angle of each of said steered wheels by changing a steering assist torque using said steering device; and said vehicle control unit is further configured:
- to set a magnitude of said steering assist torque to a first torque value, when said forward road is determined to be said left and right uniform μ road; and
- to set a magnitude of said steering assist torque to a second torque value larger than said first torque value, when said forward road is determined to be said split μ road.

4. The vehicle control apparatus according to claim 3, wherein,
said vehicle control unit is configured to set said magnitude of said steering assist torque to a third torque value which is larger than said first torque value and is smaller than said second torque value, when it is determined, based on said front image, that said forward road is not said left and right uniform μ road, and it is determined, based on said front image, that said forward road is not said split μ road.

* * * * *